United States Patent
Zhang et al.

(10) Patent No.: US 11,809,479 B2
(45) Date of Patent: Nov. 7, 2023

(54) CONTENT PUSH METHOD AND APPARATUS, AND DEVICE

(71) Applicant: Huawei Technologies Co., Ltd., Guangdong (CN)

(72) Inventors: Yingqiang Zhang, Shenzhen (CN); Yuanfeng Xiong, Shanghai (CN); Xingguang Song, Beijing (CN); Tizheng Wang, Shenzhen (CN); Maosheng Huang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 132 days.

(21) Appl. No.: 17/449,389

(22) Filed: Sep. 29, 2021

(65) Prior Publication Data

US 2022/0021742 A1  Jan. 20, 2022

Related U.S. Application Data

(63) Continuation of application No. PCT/CN2020/083771, filed on Apr. 8, 2020.

(30) Foreign Application Priority Data

Apr. 9, 2019 (CN) .......................... 201910291950.7

(51) Int. Cl.
  *G06F 16/435* (2019.01)
  *G06V 40/16* (2022.01)
  (Continued)

(52) U.S. Cl.
  CPC ............ *G06F 16/436* (2019.01); *G06V 10/58* (2022.01); *G06V 10/82* (2022.01); *G06V 40/161* (2022.01);
  (Continued)

(58) Field of Classification Search
  CPC ...... G06F 16/436; G06F 3/0488; G06F 21/32; G06V 10/58; G06V 10/82; G06V 40/161;
  (Continued)

(56) References Cited

U.S. PATENT DOCUMENTS

| 10,846,517 B1* | 11/2020 | Bulusu ................. G06V 40/161 |
| 2008/0294018 A1* | 11/2008 | Kurtz ..................... G16H 10/60 600/301 |

(Continued)

FOREIGN PATENT DOCUMENTS

| CN | 104239416 A | 12/2014 |
| CN | 104881642 A | 9/2015 |

(Continued)

*Primary Examiner* — Wesley J Tucker
(74) *Attorney, Agent, or Firm* — WOMBLE BOND DICKINSON (US) LLP

(57) ABSTRACT

A content push method is provided. The method is applied to a terminal, which includes a first set of cameras. The method includes: when the terminal is in a screen-locked state and an off-screen is woken up, capturing a first set of face images of a user by using the first set of cameras; determining whether the first set of face images matches a registered user; if the first set of face images matches the registered user, performing, by the terminal, an unlocking operation, and determining a facial attribute of the user based on the first set of face images; determining a to-be-pushed media resource based on the facial attribute; and pushing the media resource in an interface displayed after the terminal is unlocked.

20 Claims, 14 Drawing Sheets

(51) Int. Cl.
    *H04L 67/55*   (2022.01)
    *G06V 10/82*   (2022.01)
    *G06V 10/58*   (2022.01)
    *G06V 40/40*   (2022.01)
    *G06V 40/70*   (2022.01)
(52) U.S. Cl.
    CPC .......... *G06V 40/172* (2022.01); *G06V 40/174* (2022.01); *G06V 40/40* (2022.01); *G06V 40/70* (2022.01); *H04L 67/55* (2022.05)
(58) Field of Classification Search
    CPC .... G06V 40/172; G06V 40/174; G06V 40/40; G06V 40/70; H04L 67/55
    See application file for complete search history.

(56) References Cited

U.S. PATENT DOCUMENTS

| | | | | |
|---|---|---|---|---|
| 2013/0275190 | A1* | 10/2013 | Rossi | G06Q 30/0267 705/26.1 |
| 2014/0078050 | A1 | 3/2014 | Fang | |
| 2015/0254726 | A1* | 9/2015 | Cassidy | H04L 67/55 705/14.58 |
| 2015/0310259 | A1* | 10/2015 | Lau | G06V 40/169 382/118 |
| 2018/0196432 | A1 | 7/2018 | Krupat et al. | |
| 2018/0315049 | A1* | 11/2018 | Crowell | G06Q 20/341 |
| 2021/0314668 | A1* | 10/2021 | Fu | H04N 21/4223 |
| 2023/0100874 | A1* | 3/2023 | Wu | G06F 21/31 726/19 |

FOREIGN PATENT DOCUMENTS

| | | |
|---|---|---|
| CN | 103690149 B | 8/2016 |
| CN | 107633098 A | 1/2018 |
| CN | 107968890 A | 4/2018 |
| CN | 108062546 A | 5/2018 |
| CN | 207396996 U | 5/2018 |
| CN | 108989887 A | 12/2018 |
| CN | 111797249 A | 10/2020 |
| EP | 3312766 A2 | 4/2018 |

\* cited by examiner

CONTENT PUSH METHOD AND APPARATUS, AND DEVICE

CROSS-REFERENCE TO RELATED APPLICATIONS

This application is a continuation of International Application No. PCT/CN2020/083771, filed on Apr. 8, 2020, which claims priority to Chinese Patent Application No. 201910291950.7, filed on Apr. 9, 2019. The disclosures of the aforementioned applications are hereby incorporated by reference in their entireties.

TECHNICAL FIELD

The present disclosure relates to the field of terminal technologies, and in particular, to a content push method and apparatus, and a device.

BACKGROUND

A face image includes abundant information. Both a person's identity and facial expression can be recognized based on a face image, and a person's health status can be identified based on face information. Identity information of a person can be recognized through facial recognition, and facial recognition has been widely applied to applications such as identity-based security authorization. For example, facial recognition is used to unlock a mobile terminal device, and is used to perform identity authentication for a payment application. A main feature that can reflect an emotion category is extracted from a face image, and an expression type is recognized based on the main feature, to recognize an expression type of a user, for example, happy, sad, surprised, angry, disgusted, scared, or neutral. The expression type is applied to intelligent content recommendation and push by a mobile terminal.

A conventional technology, for example, a patent CN201710969400.7, discloses a content recommendation method and a mobile terminal. The method is as follows.

Step 201: After the mobile terminal is unlocked, detect a touch operation of a user. The touch operation may be a tap operation, a double-tap operation, a touch and hold operation, a swipe operation, or the like.

Step 202: When the touch operation meets a first preset condition, determine a user attribute of the user based on facial feature information. The facial feature information may be feature information collected by a front-facing camera of the mobile terminal, or may be facial feature information collected by a rear-facing camera of the mobile terminal. Face information may be nose, mouth, eyes, wrinkles, hair, some other facial feature information of the user, or the like. The attribute of the user may be a gender, an age, an expression, or the like of the user. If a feature such as beard or short hair is recognized by recognizing the facial feature information, it may be determined that the gender of the user is male; or a feature such as long hair, false eyelashes, or tattooed eyebrows is recognized by recognizing the facial feature information, it may be determined that the gender of the user is female. A feature such as a skin roughness degree, a skin aging degree, a depth of wrinkles, or a length of wrinkles of the user is recognized, to determine the age of the user, and the like.

Step 203: Search for to-be-recommended content associated with the user attribute. The user attribute includes at least one of an age, a gender, an expression, and a style. The expression may be happy, sad, smiling, crying, or the like. The user attribute may be the gender of the user. When the gender of the user is male, some articles used by the male may be recommended. When the gender of the user is female, some articles used by the female may be recommended. The user attribute may be the age of the user. When the user is 12 years old, some articles used by young people may be recommended. When the user is 40 years old, some articles used by middle-aged people may be recommended. The user attribute may be the expression. For example, when the expression of the user is happy, some happy advertisements may be recommended; or the expression of the user is sad or crying, some comforting advertisements may be recommended. A current status of the user may be determined based on the expression. When the expression of the user is tired, some rest suggestion messages may be found and prompted to the user.

Step 204: Display the to-be-recommended content.

The conventional technology has the following disadvantages.

According to the content recommendation method in the conventional technology 1, although user attribute information can be recognized based on a face image obtained during unlocking, a trigger by a touch of the user is required to start a user attribute recognition operation, and consequently, interaction is not friendly enough.

SUMMARY

The present disclosure provides a content push method. In an application scenario in which "facial recognition" is used for unlocking a terminal, facial attribute analysis is further triggered by successful facial recognition; a current referable facial attribute of a user is determined; a closely related media resource is determined based on the facial attribute (an emotion or a health status); and the media resource is pushed in an interface displayed after the terminal is unlocked. Some appropriate media resources are targetedly pushed to the user based on the emotion or the health status of the user, so that subjective experience of using the terminal by the user is improved. In addition, an image for facial recognition unlocking can be reused for facial attribute analysis. This improves terminal resource utilization and reduces power consumption.

Specific technical solutions provided in the embodiments of the present disclosure are as follows.

According to a first aspect, an embodiment of the present disclosure provides a content push method. The method is applied to a terminal, the terminal includes a first set of cameras, and the first set of cameras includes one or more of an RGB camera, a depth camera, a near infrared camera, a hyperspectral camera, or a thermal imaging camera. The method includes:

when the terminal is in a screen-locked state and an off-screen is woken up, capturing a first set of face images of a user by using the first set of cameras; determining whether the first set of face images matches a registered user; if the first set of face images matches the registered user, performing, by the terminal, an unlocking operation, and determining a facial attribute of the user based on the first set of face images, where the facial attribute includes one of an age, a gender, an emotion, or a health status; determining a to-be-pushed media resource based on the facial attribute; and pushing the media resource in an interface displayed after the terminal is unlocked.

According to a second aspect, an embodiment of the present disclosure provides a content push apparatus. The apparatus is applied to a terminal, the terminal includes a first set of cameras, and the first set of cameras includes one or more of an RGB camera, a depth camera, a near infrared camera, a hyperspectral camera, or a thermal imaging camera. The apparatus includes:

a capture module, configured to: when the terminal is in a screen-locked state and an off-screen is woken up, capture a first set of face images of a user by using the first set of cameras;

a determining module, configured to determine whether the first set of face images matches a registered user;

an unlocking module, configured to perform an unlocking operation if the first set of face images matches the registered user;

a facial attribute determining module, configured to determine a facial attribute of the user based on the first set of face images if the first set of face images matches the registered user, where the facial attribute includes at least one of an age, a gender, an emotion, or a health status;

a media resource determining module, configured to determine a to-be-pushed media resource based on the facial attribute; and a push module, configured to push the media resource in an interface displayed after the terminal is unlocked.

According to the technical solutions of the foregoing method and apparatus provided in the embodiments of the present disclosure, when face unlocking succeeds, the facial attribute may be further analyzed, and the media resource may be pushed in real time based on the facial attribute. This provides personalized experience for a user in a more user-friendly manner, and enhances user loyalty.

According to the first aspect or the second aspect, in an embodiment, the determining a facial attribute of the user based on the first set of face images includes: determining the facial attribute of the user based on only the first set of face images. This step may be performed or assisted by the facial attribute determining module.

According to the first aspect or the second aspect, in an embodiment, the terminal further includes a second set of cameras, the second set of cameras includes a subset of cameras other than the first set of cameras in the terminal, and the method further includes: when the terminal is in the screen-locked state and the off-screen is woken up, capturing a second set of face images of the user by using the second set of cameras; and the determining a facial attribute of the user based on the first set of face images includes: determining the facial attribute of the user based on the first set of face images and the second set of face images. This step may be performed or assisted by the capture module and the facial attribute determining module.

In an embodiment, moments of capturing the first set of face images and the second set of face images may be the same or may be different. For example, time of shooting the first set of face images is earlier than time of shooting the second set of face images. In an embodiment, after authentication on a user identity by using the first set of face images succeeds, a system is triggered to invoke the second set of cameras to capture the second set of face images, to provide more abundant image data input for analyzing the facial attribute.

According to the first aspect or the second aspect, in an embodiment, the determining a facial attribute of the user based on the first set of face images includes: determining a current facial attribute of the user based on the first set of face images and a facial attribute result that is obtained through analysis in a preset historical time period, that is, determining a comprehensive facial attribute result based on both a facial attribute analysis result in the historical time period and a facial attribute analysis result that is obtained based on the first set of face images. In an embodiment, the comprehensive result may be determined by using a statistical method or according to a rule such as system customization or user customization. This step may be performed or assisted by the facial attribute determining module.

According to the first aspect or the second aspect, in an embodiment, the determining a facial attribute of the user based on the first set of face images includes: determining a first facial attribute result based on the first set of face images; obtaining a facial attribute result of the current user in a preset historical time period; and determining the facial attribute of the user based on the first facial attribute result and the facial attribute result of the current user in the preset historical time period.

According to the first aspect or the second aspect, in an embodiment, the determining a facial attribute of the user based on the first set of face images includes: determining a current facial attribute of the user based on the first set of face images, the second set of face images, and a facial attribute result that is obtained through analysis in a preset historical time period, that is, determining a comprehensive facial attribute result based on both a facial attribute analysis result in the historical time period and a facial attribute analysis result that is obtained based on the first set of face images and the second set of face images. In an embodiment, the comprehensive result may be determined by using a statistical method or according to a rule such as system customization or user customization. This step may be performed or assisted by the capture module and the facial attribute determining module.

In an embodiment, moments of capturing the first set of face images and the second set of face images may be the same or may be different. For example, time of shooting the first set of face images is earlier than time of shooting the second set of face images. In an embodiment, after authentication on a user identity by using the first set of face images succeeds, a system is triggered to invoke the second set of cameras to capture the second set of face images, to provide more abundant image data input for analyzing the facial attribute.

According to the first aspect or the second aspect, in an embodiment, that the off-screen is woken up includes: The off-screen is woken up by lifting the terminal, data cable insertion and removal, headset insertion and removal, charger insertion and removal, touching the screen, triggering a power button, an incoming call, a message prompt, or voice activation.

According to the first aspect or the second aspect, in an embodiment, the determining a to-be-pushed media resource based on the facial attribute includes: determining the to-be-pushed media resource based on different degrees of health, different ages, different genders, or different emotions, a preset priority of a facial attribute category, or a preset priority of a media resource type, where the media resource includes a shopping link, a literary book, a travel item, a film and television work, a short video, a microblog, fitness information, music, a health report, prompt information (for example but not limited to suggestions or tips for a current health or emotion status, such as drinking time, harm of unhealthy emotions, and how to regulate unhealthy emotions), an application program link or icon (for example but not limited to WeChat, Headlines, payment, and TikTok), news, or the like. This step may be performed or assisted by the media resource determining module. In an embodiment, there may be one or more determined to-be-pushed media resources.

According to the first aspect or the second aspect, in an embodiment, the pushing the media resource in an interface displayed after the terminal is unlocked includes: pushing a notification bar or a floating window of the media resource in the interface displayed after the terminal is unlocked. This step may be performed or assisted by the push module. In an embodiment, there may be one or more displayed media resources that are pushed.

According to the first aspect or the second aspect, in an embodiment, when the media resource is pushed in the interface displayed after the terminal is unlocked, the method further includes: displaying an option of an instruction indicating whether to receive the pushed media resource; and when a push confirmation instruction of the user is received, jumping to a push link of the media resource, or playing or browsing a pushed media resource, where a manner of jumping to the push link includes but is not limited to a manner of jumping to a related app, a web page link, a mini program, or the like; or when an instruction indicating that the user does not receive the push, canceling pushing of the media resource, and displaying a current default interface of the system.

According to the first aspect or the second aspect, in an embodiment, the system may push the media resource in the interface displayed after the terminal is unlocked, or an application program may push the media resource in the interface displayed after the terminal is unlocked.

According to the first aspect or the second aspect, in an embodiment, when the system or the application program pushes the media resource in the interface displayed after the terminal is unlocked, media resource push time may last for preset duration too, where a value of too may be set by the system or the user, for example but not limited to 2 s, 3 s, 5 s . . . ; and after the pushed media resource is displayed for too, the pushed media resource may automatically disappear from the display interface, or may be hidden and run in the background, or may provide more function options for the user for subsequent operations.

According to the first aspect or the second aspect, in an embodiment, when the system or the application program pushes the media resource in the interface displayed after the terminal is unlocked, the media resource may be displayed in a floating window manner, or may be displayed in a full screen mode. A "vacant" area (to be specific, no application icon or function icon is included) may be determined in the current interface displayed after unlocking, and a proper position is determined in the "vacant" area for layout display. In addition, a shape of a push window for layout display includes but is not limited to a square, a circle, a triangle, an irregular shape, or the like.

According to the first aspect or the second aspect, in an embodiment, there may be one or more registered users. When there is only one registered user, both facial identity authentication and facial attribute analysis are performed based on the unique user. When there are a plurality of registered users, facial authentication and facial attribute analysis are independently performed for any registered user independently, and there is no mutual impact between users. In particular, when analysis is performed based on "historical data", data analysis for a user is isolated from data analysis for other users.

More specifically, in the foregoing possible technical implementations, a processor may invoke a program and instructions in a memory to perform corresponding processing, such as algorithm implementation and signal obtaining.

According to a third aspect, an embodiment of the present disclosure provides a content push method. The method is applied to a terminal, the terminal includes a first set of cameras, and the first set of cameras includes one or more of an RGB camera, a depth camera, a near infrared camera, a hyperspectral camera, or a thermal imaging camera. The method includes:

when the terminal is in a screen-locked state and an off-screen is woken up, capturing a first set of face images of a user by using the first set of cameras; determining a facial attribute of the user based on the first set of face images, where the facial attribute includes one of an age, a gender, an emotion, or a health status; determining a to-be-pushed media resource based on the facial attribute; and pushing the media resource in a display interface of the terminal. In some scenarios, face unlocking sometimes may be time-consuming. Wakeup of the off-screen can directly trigger face image capture and facial emotion analysis, so that the media resource can be pushed earlier.

According to a fourth aspect, an embodiment of the present disclosure provides a content push apparatus. The apparatus is applied to a terminal, the terminal includes a first set of cameras, and the first set of cameras includes one or more of an RGB camera, a depth camera, a near infrared camera, a hyperspectral camera, or a thermal imaging camera. The apparatus includes: a capture module, configured to: when the terminal is in a screen-locked state and an off-screen is woken up, capture a first set of face images of a user by using the first set of cameras; a facial attribute determining module, configured to determine a facial attribute of the user based on the first set of face images if the first set of face images matches a registered user, where the facial attribute includes at least one of an age, a gender, an emotion, or a health status; a media resource determining module, configured to determine a to-be-pushed media resource based on the facial attribute; and a push module, configured to push the media resource in a display interface of the terminal.

According to the third aspect or the fourth aspect, in an embodiment, that the off-screen is woken up includes: The off-screen is woken up by lifting the terminal, data cable insertion and removal, headset insertion and removal, charger insertion and removal, touching the screen, triggering a power button, an incoming call, a message prompt, or voice activation.

According to the third aspect or the fourth aspect, in an embodiment, the to-be-pushed media resource is determined based on different degrees of health, different ages, different genders, or different emotions, a preset priority of a facial attribute category, or a preset priority of a media resource type, where the media resource includes a shopping link, a literary book, a travel item, a film and television work, a short video, a microblog, fitness information, music, a health report, prompt information, an application program, or news.

According to the third aspect or the fourth aspect, in an embodiment, a notification bar or a floating window of the media resource is pushed in the interface displayed after the terminal is unlocked.

According to the third aspect or the fourth aspect, in an embodiment, the media resource may be pushed after unlocking, or may be pushed in an unlocking process. For example, in a face unlocking process, a media resource that matches a current facial attribute of the user may be displayed in an unlocking interface, for example, a picture, an animation, news, or a short article. Further, after face unlocking succeeds, the user can normally use all programs of the terminal. In an embodiment, the unlocking screen is not janky, or an unlocking success prompt is not visible to the user. For example, the user is currently reading a short article. If face unlocking succeeds in the reading process, the short article may still be displayed in the display interface of the terminal, and after reading, the user can continue to use the terminal normally by using any executable operation instruction. If face unlocking of the user fails, only the foregoing media resource can be displayed in the display interface of the terminal, and no more functions (except an emergency function) can be used.

According to the third aspect or the fourth aspect, in an embodiment, when the terminal detects that the off-screen is woken up, and the media resource is pushed in the display interface of the terminal, if face unlocking succeeds, more function operations may be displayed in the current media resource or the display interface; or if face unlocking fails, only the media resource may be displayed. In this way, the user may be notified, based on a change in the interface, whether unlocking succeeds.

According to the third aspect or the fourth aspect, in an embodiment, after pushing of the media resource in the interface displayed after the terminal is unlocked lasts for preset duration, the media resource disappears from the interface.

At the moment the user picks up the terminal, the user can obtain pushed content that matches a physical and mental status of the user. This improves user experience.

According to a fifth aspect, an embodiment of the present disclosure provides a terminal device. The terminal device includes a camera, a memory, a processor, and a bus, and the camera, the memory, and the processor are connected through the bus. The memory is configured to store a computer program and instructions. The camera is configured to capture an image. The processor is configured to invoke the instructions and the computer program that are stored in the memory, and control the camera to capture the image; and is configured to enable the terminal device to perform the method according to any one of the foregoing designs.

According to the fifth aspect, in an embodiment, the terminal device further includes an antenna system. The antenna system sends and receives a wireless communication signal under control of the processor, to implement wireless communication with a mobile communications network. The mobile communications network includes one or more of the following: a GSM network, a CDMA network, a 3G network, a 4G network, a 5G network, an FDMA network, a TDMA network, a PDC network, a TACS network, an AMPS network, a WCDMA network, a TDSCDMA network, a Wi-Fi network, and an LTE network.

The technical solutions in the foregoing designs may be combined without violating the laws of nature.

In the present disclosure, when "face unlocking" of the user succeeds, a media resource that is adapted to the current emotion or health status of the user or that is consistent with the age or gender is pushed to the user "in a first time". "Providing exactly what the user needs" can improve, in a more user-friendly manner, experience of using a terminal by the user.

DESCRIPTION OF EMBODIMENTS

The following clearly describes the technical solutions in embodiments of the present disclosure with reference to the accompanying drawings in the embodiments of the present disclosure.

In the embodiments of the present disclosure, a terminal may be a device that provides a user with video shooting and/or data connectivity, a handheld device with a wireless connection function, or another processing device connected to a wireless modem, for example, a digital camera, a single-lens reflex camera, a mobile phone (or referred to as a "cellular" phone), or a smartphone. The terminal may be a portable, pocket-sized, handheld, or wearable device (for example, a smartwatch), a tablet computer, a personal computer (Personal Computer), a PDA (personal digital assistant), a vehicle-mounted computer, a drone, an aerial device, or the like.

Figure 1:
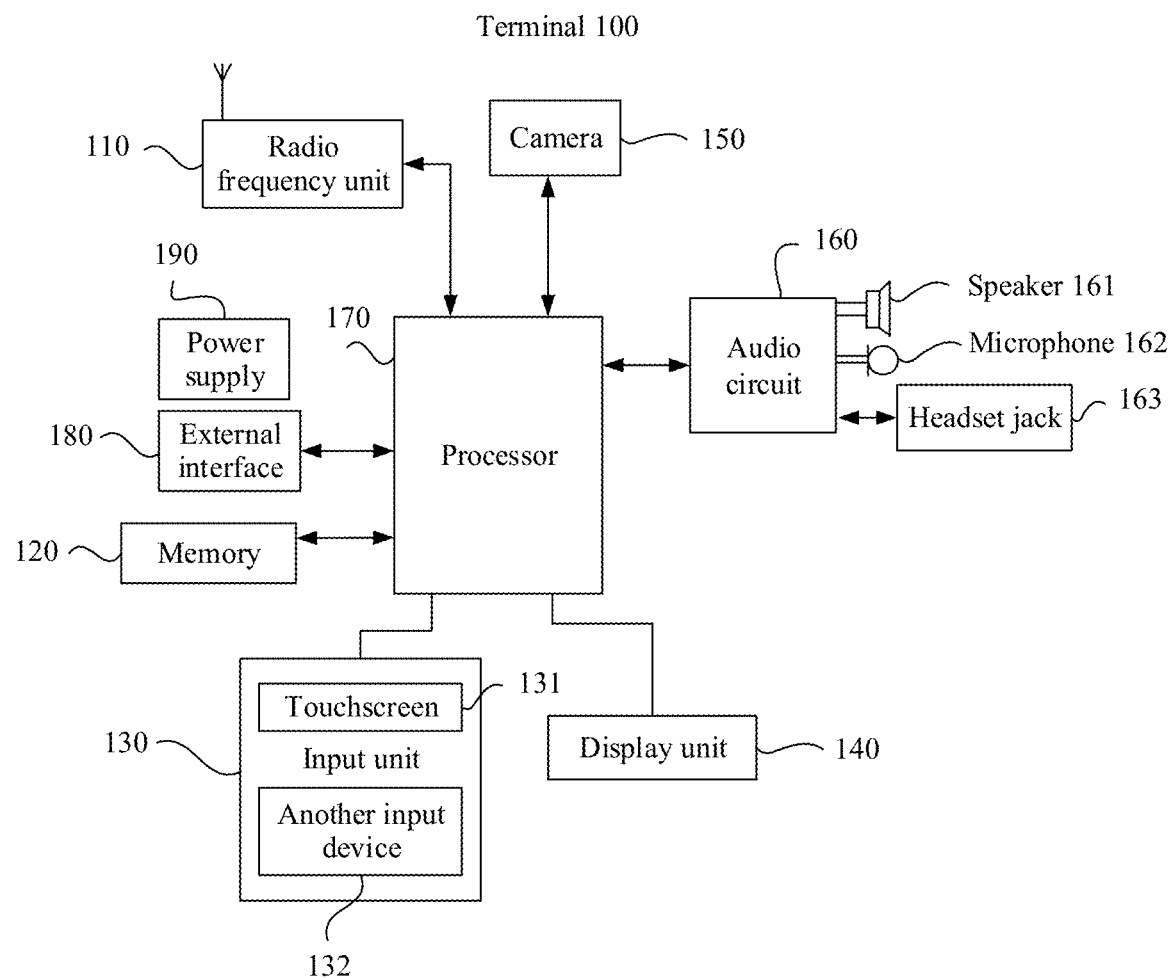
FIG. 1 is a schematic diagram of a structure of a terminal according to an embodiment of the present disclosure.

FIG. 1 is a schematic diagram of an optional hardware structure of a terminal 100.

As shown FIG. 1, the terminal 100 may include components such as a radio frequency unit 110, a memory 120, an input unit 130, a display unit 140, a camera 150, an audio circuit 160 (including a speaker 161 and a microphone 162), a processor 170, an external interface 180, and a power supply 190. A person skilled in the art may understand that FIG. 1 is merely an example of an intelligent terminal or a multi-functional device, and does not constitute a limitation on the intelligent terminal or the multi-functional device.

The intelligent terminal or the multi-functional device may include more or fewer components than those shown in the figure, or combine some components, or include different components. For example, the intelligent terminal or the multi-functional device includes at least the memory 120, the processor 170, and the camera 150.

The camera 150 is configured to capture an image or a video, and may be triggered to start by using an application program instruction, to implement a shooting function or a photographing function, for example, to shoot and obtain a picture or a video of any scene. The camera may include components such as an imaging lens, a light filter, and an image sensor. Light rays emitted or reflected by an object enter the imaging lens and converge on the image sensor through the light filter. The imaging lens is mainly configured to converge light emitted or reflected by all objects in a shooting angle of view (which may also be referred to as to-be-shot scenes, to-be-shot objects, target scenes, or target objects, and may also be understood as scene images that a user expects to shoot), to form an image. The light filter is mainly configured to filter out an unwanted light wave (for example, a light wave except visible light, such as infrared light) in light rays. The image sensor is mainly configured to: perform optical-to-electrical conversion on a received optical signal, to obtain an electrical signal; and input the electrical signal to the processor 170 for subsequent processing. The camera may be located in the front of the terminal device, or may be located in the back of the terminal device. A specific quantity and a specific arrangement manner of cameras may be flexibly determined based on a requirement of a designer or a vendor policy. This is not limited in this application.

The input unit 130 may be configured to: receive input number or character information, and generate a key signal input related to user settings and function control of a portable multi-functional apparatus. Specifically, the input unit 130 may include a touchscreen 131 and/or another input device 132. The touchscreen 131 may collect a touch operation (for example, an operation performed by the user on the touchscreen or near the touchscreen by using any proper object such as a finger, a joint, or a stylus) of the user on or near the touchscreen, and drive a corresponding connection apparatus based on a preset program. The touchscreen may detect a touch action of the user on the touchscreen, convert the touch action into a touch signal, and send the touch signal to the processor 170; and can receive and execute a command sent by the processor 170. The touch signal includes at least touch point coordinate information. The touchscreen 131 may provide an input interface and an output interface between the terminal 100 and the user. In addition, the touchscreen may be implemented in various types such as a resistive type, a capacitive type, an infrared type, and a surface acoustic wave type. In addition to the touchscreen 131, the input unit 130 may further include the another input device. Specifically, the another input device 132 may include but is not limited to one or more of a physical keyboard, a function button (such as a volume control button 132 or a power button 133), a trackball, a mouse, a joystick, and the like. In an embodiment, the touchscreen 131 may include two parts: a touch detection apparatus and a touch controller. The touch detection apparatus detects a touch orientation of the user, detects a signal generated by the touch operation, and transmits the signal to the touch controller. The touch controller receives touch information from the touch detection apparatus, converts the touch information into touch point coordinates, and then sends the touch point coordinates to the processor 170; and can receive and execute a command sent by the processor 170.

The display unit 140 may be configured to display information input by the user or information provided for the user, various menus of the terminal 100, an interactive interface, file display, and/or playing of any multimedia file, or may be configured to present an interface to implement human-computer interaction. In this embodiment of the present disclosure, the display unit is further configured to display the image or the video obtained by the device by using the camera 150. The image or the video may include a preview image/a preview video in some shooting modes, a shot initial image/shot initial video, and a target image/a target video that is processed by using a specific algorithm after shooting.

Further, the touchscreen 131 may cover a display panel 141. After detecting a touch operation on or near the touchscreen 131, the touchscreen 131 transfers the touch operation to the processor 170 to determine a type of a touch event. Then, the processor 170 provides a corresponding visual output on the display panel 141 based on the type of the touch event. In this embodiment, the touchscreen and the display unit may be integrated into one component to implement input, output, and display functions of the terminal 100. For ease of description, in this embodiment of the present disclosure, a touch display screen represents a function set of the touchscreen and the display unit. In some embodiments, the touchscreen and the display unit may alternatively be used as two independent components. In an embodiment, the display panel 141 may be configured in a form of a liquid crystal display (LCD) screen, an organic light-emitting diode (OLED), or the like. Further, the touchscreen 131 may cover the display panel 141. After detecting a touch operation on or near the touchscreen 131, the touchscreen 131 transfers the touch operation to the processor 170 to determine a type of a touch event. Then, the processor 170 provides a corresponding visual output on the display panel 141 based on the type of the touch event.

The memory 120 may be configured to store instructions and data. The memory 120 may mainly include an instruction storage area and a data storage area. The data storage area may store various types of data such as a multimedia file and text. The instruction storage area may store software units such as an operating system, an application, and instructions required by at least one function, or a subset and an extension set of the software units. The memory 120 may further include a non-volatile random access memory and provide the processor 170 with functions including managing hardware, software, and data resources on a calculation processing device and supporting control on the software and an application. The memory 120 is further configured to store a multimedia file, and store an execution program and an application. In an embodiment, the memory 120 may mainly include a program storage area and a data storage area. The program storage area may store an operating system, various application programs (such as communications applications), a facial recognition module, an expression recognition module, a health recognition module, a user profile, and the like. The data storage area may store data (for example, multimedia files such as various pictures and video files, and facial information templates) created based on using of the terminal device. The memory 120 may include a high-speed random access memory, or may include a non-volatile memory such as at least one magnetic disk storage device, a flash memory device, or another volatile solid-state storage device.

The processor 170 is a control center of the terminal 100, and is connected to various parts of the entire mobile phone through various interfaces and lines. The processor 170 performs various functions and data processing of the terminal 100 by running or executing the instructions stored in the memory 120 and invoking the data stored in the memory 120, to perform overall control on the mobile phone. In an embodiment, the processor 170 may include one or more processing units. Preferably, the processor 170 may be integrated with an application processor and a modem processor. The application processor mainly processes an operating system, a user interface, an application program, and the like. The modem processor mainly processes wireless communication. It may be understood that the modem processor may alternatively not be integrated into the processor 170. In some embodiments, the processor and the memory may be implemented on a single chip. In some embodiments, the processor and the memory may be separately implemented on independent chips. The processor 170 may be further configured to: generate a corresponding operation control signal and send the operation control signal to a corresponding component in the calculation processing device, and read and process data in software, especially read and process the data and the program in the memory 120, so that functional modules in the processor 170 perform corresponding functions, to control a corresponding component to perform an action as required by an instruction.

The radio frequency unit 110 may be configured to receive and send information or receive and send a signal in a call process. For example, the radio frequency unit 110 receives downlink information from a base station, sends the downlink information to the processor 170 for processing, and sends related uplink data to the base station. Usually, an RF circuit includes but is not limited to an antenna, at least one amplifier, a transceiver, a coupler, a low noise amplifier (LNA), a duplexer, and the like. In addition, the radio frequency unit 110 may further communicate with a network device and another device through wireless communication. The wireless communication may use any communications standard or protocol, which includes but is not limited to a global system for mobile communications (GSM), a general packet radio service (GPRS), code division multiple access (CDMA), wideband code division multiple access (WCDMA), long term evolution (LTE), an email, a short message service (SMS), and the like.

The audio circuit 160, the speaker 161, and the microphone 162 may provide an audio interface between the user and the terminal 100. The audio circuit 160 may convert received audio data into an electrical signal, and transmit the electrical signal to the speaker 161; and the speaker 161 converts the electrical signal into a sound signal, and outputs the sound signal. In addition, the microphone 162 is configured to collect a sound signal, and may further convert the collected sound signal into an electrical signal; and the audio circuit 160 receives the electrical signal, converts the electrical signal into audio data, outputs the audio data to the processor 170 for processing, and then sends processed audio data to, for example, another terminal through the radio frequency unit 110, or outputs the audio data to the memory 120 for further processing. The audio circuit may also include a headset jack 163, configured to provide a connection interface between the audio circuit and a headset. Specific quantities and specific arrangement manners of speakers and microphones may be flexibly determined based on a requirement of a designer or a vendor policy. This is not limited in this application.

The terminal 100 further includes the power supply 190 (such as a battery) that supplies power to each component. Preferably, the power supply may be logically connected to the processor 170 by using a power supply management system, to implement functions such as charging, discharging, and power consumption management by using the power supply management system.

The terminal 100 further includes the external interface 180. The external interface may be a standard micro-USB port, or may be a communications interface such as a multi-pin connector. The external interface may be configured to connect the terminal 100 to another apparatus for physical connection and communication, or may be configured to connect to a charger to charge the terminal 100. In an embodiment, the external interface 180 is connected to a communications interface of another device through a cable, implement data transmission between the terminal device 100 and the another device.

Although not shown, the terminal 100 may further include a flash light, a wireless fidelity (Wi-Fi) module, a Bluetooth module, sensors with different functions, and the like. A Wi-Fi technology is a short-range wireless transmission technology. The terminal device 100 may connect to an access point (AP) by using the Wi-Fi module, to access a data network. The Wi-Fi module 190 may be configured to send and receive data in a communication process. For example, when the terminal device 100 is a mobile phone, the terminal device 100 may include the radio frequency circuit 110 and may further include the Wi-Fi module; when the terminal device 100 is a computer, the terminal device 100 may include the external interface 180 and may further include the Wi-Fi module; or when the terminal device 100 is a tablet, the terminal device 100 may include the Wi-Fi module. Other modules are not described herein. A part or all of methods described below may be applied to the terminal shown in FIG. 1.

Figure 2:
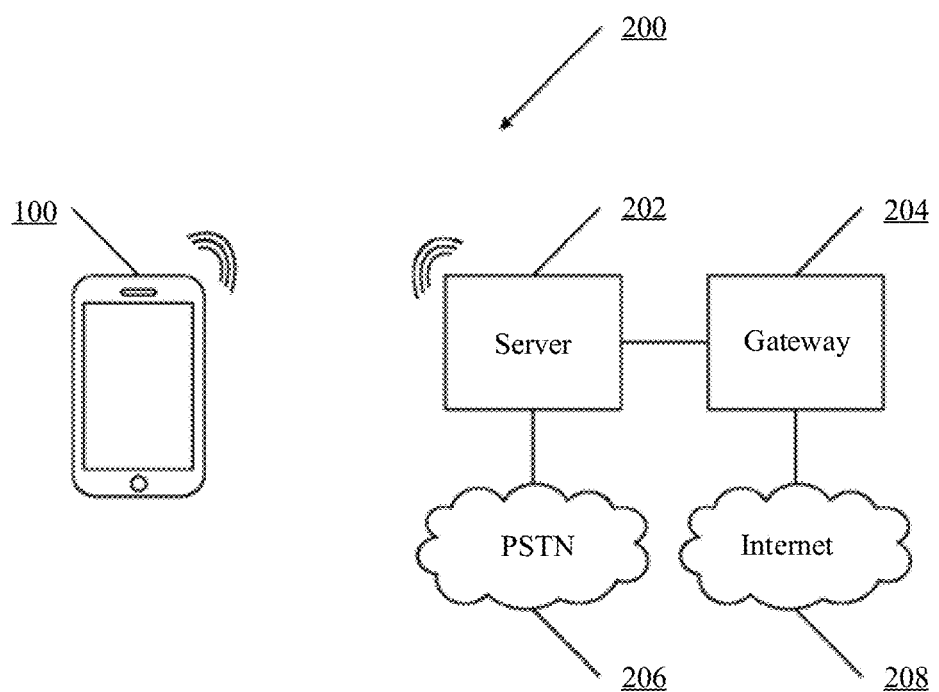
FIG. 2 is a schematic diagram of an example operating environment of a terminal system according to an embodiment of the present disclosure.
Figure 3:
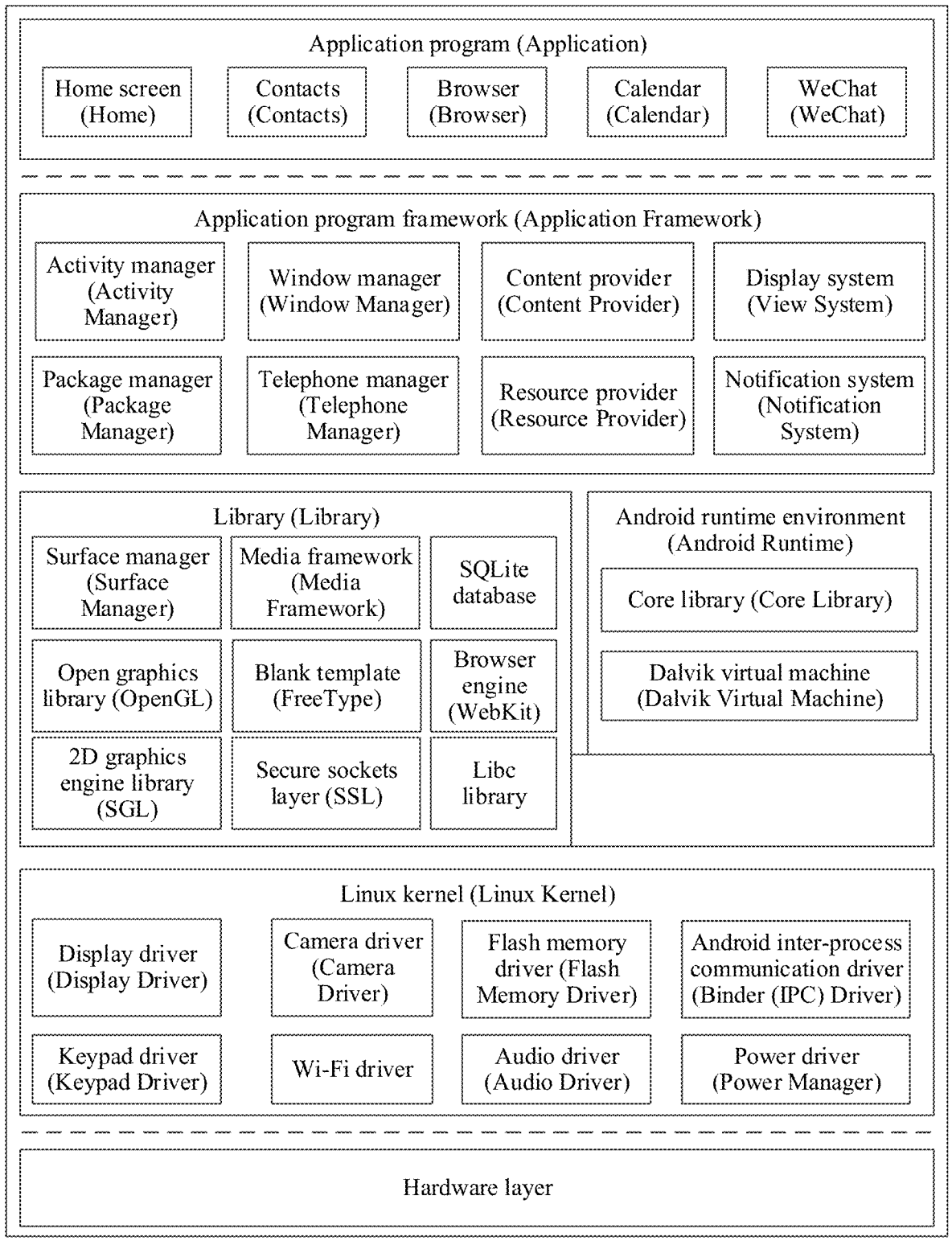
FIG. 3 is a schematic diagram of an operating system of a terminal according to an embodiment of the present disclosure.

FIG. 2 shows an example operating environment of a terminal system according to the present disclosure. An operating environment 200 may include a server 202, a gateway 204, and a public switched telephone network ("PSTN") 206 and/or another network such as the internet 208, a cellular network, a satellite network, and/or the like. A terminal device 100 may use one or more operations of the hardware and/or software components described above in the operating environment 200. The terminal device 100 may communicate with the server 202 through a wireless network and/or a wired network. For example, the server 202 may be connected to the terminal device 100 in a wired manner and/or through a wireless cellular network for communication. In addition, the server 202 may connect the terminal device 100 to the PSTN 206, and the connection may enable the terminal device 100 to initiate and/or receive a phone call. The server 202 may further connect the terminal device 100 to the gateway 204, and the connection may enable the terminal device 100 to access a wide area network, for example, the internet 208. FIG. 1 shows a structural framework of the terminal device from a perspective of hardware composition. In FIG. 3, an example in which the operating system is an Android system on a mobile terminal is used to describe a system framework of a software operating system related to the method in the embodiments of the present disclosure. It should be noted that the method in the embodiments of the present disclosure may be applied to operating systems such as an Android system, an iOS system, a Darwin system, an RTXC system, a Linux system, a Unix system, a Windows system, and an embedded operating system such as VxWorks.

Specifically, Android is an open-source mobile operating system. As a mobile device platform, a hierarchy of Android includes an operating system, middleware, and an application program (Application). As shown in FIG. 3, the Android operating system is divided into the following layers:

(1) Application Program Layer (Application)

Developers may develop an application program based on an Android software development kit (SDK), and the operating system also includes some basic applications, for example, system-level applications such as an SMS application, a phone application, an image viewer, and a web page (Web) browser.

(2) Application Program Framework Layer (Application Framework)

The application program framework layer of Android provides various application programming interfaces (API) for the application layer, where the application programming interfaces include various controls required in a user interface (UI) program, for example, Views (view components) include TextView (text control), ListView (list), Buttons, and WebView (web page browser control).

(3) System Library and Runtime Environment Layer (Libraries&Android Runtime)

This layer includes two parts: various libraries and a runtime environment. The various libraries mainly include a C library, a multimedia library, a graphics processing engine, and the like. The runtime environment is mainly the Dalvik virtual machine, where the Dalvik virtual machine is different from the standard Java virtual machine, and the Dalvik virtual machine executes a .dex file and is a tailored and optimized virtual machine for a mobile device.

(4) Linux Kernel Layer (Kernel)

Android is developed based on the Linux kernel, and a core system service, memory management, process management, a network protocol, and driving of Android all depend on the Linux kernel. A hardware layer of the mobile phone described in FIG. 2 is a lower layer of the Linux kernel layer.

The present disclosure may be applied to a terminal device having a shooting function (including at least one of the shooting function or a photographing function), and an implemented product may be in a form of an intelligent terminal, for example, a product on which a camera is installed, for example, a mobile phone, a tablet computer, a DV, a video camera, a camera, a portable computer, a notebook computer, an intelligent robot, a television, a security protection system, or a drone. Specifically, functional modules in the present disclosure may be deployed on a DSP chip of a related device, and may be an application program or software in the DSP chip. In the present disclosure, the functional modules are deployed on the terminal device, to provide an image processing function through software installation or upgrade and hardware invoking and cooperation.

The present disclosure may be applied to facial recognition scenarios, for example, interactive operations such as facial recognition unlocking, and facial recognition browsing of a private file. In the present disclosure, a face image of a user may be obtained and detected when the user uses face unlocking, and a facial attribute of the user may be obtained by using a facial attribute recognition network. This feature can be used to build precise user profiles on the cloud and devices, set and recommend themes, ringtones, music, moods, and profile pictures, and monitor and prompt health statuses.

The present disclosure is based on a design of a facial attribute recognition system framework when face unlocking is used. When a user unlocks a terminal device through face unlocking, the terminal device equipped with a camera captures a face image, then performs related preprocessing operations on the captured face image, and inputs a preprocessed face image to a facial recognition network for user identity (ID) recognition. This is a facial identity recognition process. The preprocessing operations during face unlocking include face detection, key point locating, face alignment, and the like. The preprocessed face image is input into a facial attribute recognition network to determine a facial attribute. Further, user ID (identity) information obtained through facial recognition may be associated with a facial attribute result, to establish a system-level user facial attribute management database. In this process, face unlocking information in a preset time period may be used to determine and manage a facial attribute.

The following describes the present disclosure in detail by using examples.

Example 1: Content Push Triggered by "Facial Recognition"

Figure 4:
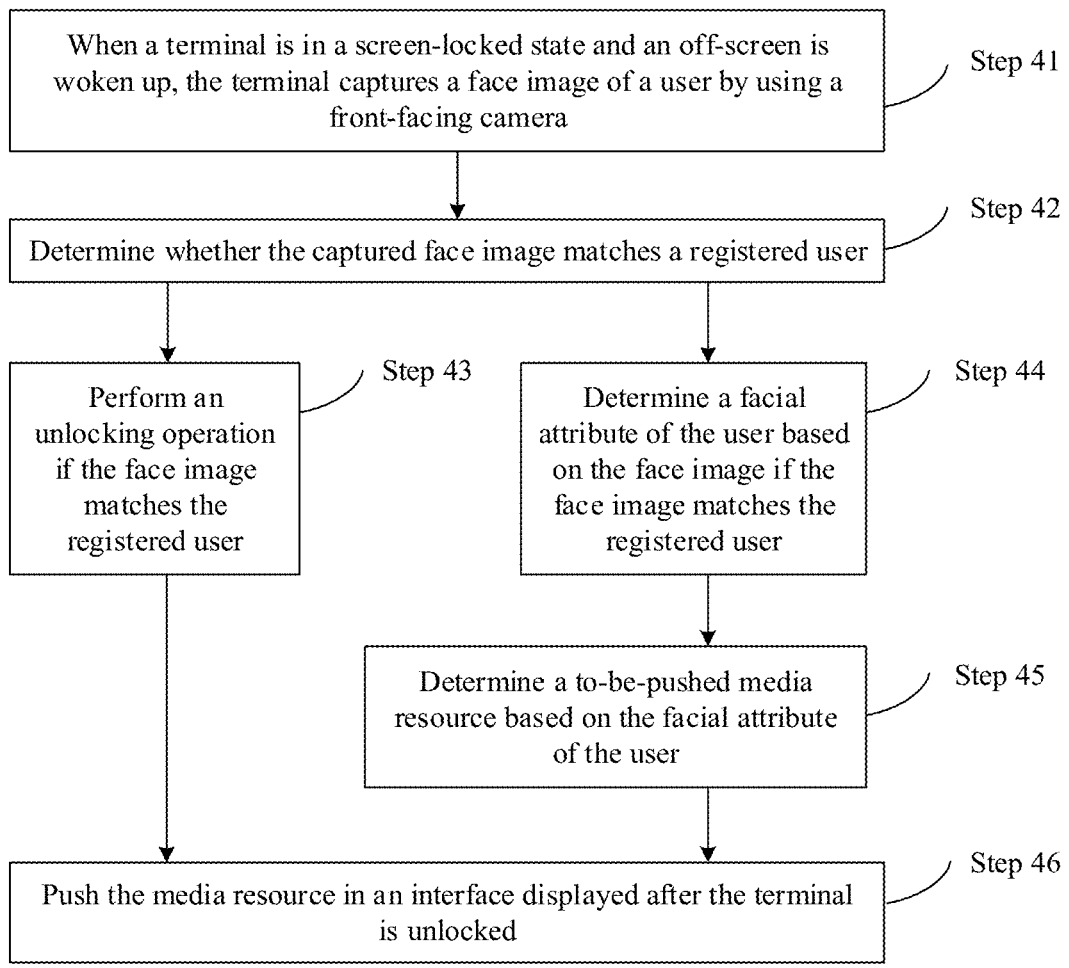
FIG. 4 is a flowchart of a content push method according to an embodiment of the present disclosure.

Specifically, refer to FIG. 4. FIG. 4 is a flowchart of a content push method according to an embodiment of the present disclosure. The method may be performed in a facial recognition process. In a specific implementation process, a terminal may preconfigure a facial recognition mode or scenario, for example, a facial recognition unlocking scenario, or other facial authentication scenarios of browsing a private file and payment.

The following uses the facial recognition unlocking scenario as an example. The content push method may include the following steps.

Step 41: When the terminal is in a screen-locked state and an off-screen is woken up, the terminal captures a face image of a user by using a camera.

A corresponding function may be integrated into a system to detect whether the off-screen of the terminal is woken up. That the off-screen of the terminal is woken up includes but is not limited to: The off-screen is woken up by lifting the terminal, touching a housing of the terminal, triggering a power button, an incoming call, a message prompt, data cable insertion and removal, headset insertion and removal, charger insertion and removal, voice activation (such as voiceprint recognition), wireless remote control, an application prompt, or the like.

In an embodiment, as long as the off-screen is woken up, no matter in any environment (whether there is a user, anywhere, at any time, or the like), the camera can be started to capture an image. If a facial recognition function is preset on the terminal, when the off-screen of the terminal is woken up, an image is captured by using the camera of the terminal. If a user triggers wakeup of the off-screen, a front-facing camera of the terminal may capture a face image of the user. If the off-screen of the terminal is not woken up, a current running status of the terminal may be maintained. The present disclosure sets no limitation on a specific case of the running status of the terminal when the screen is locked, and on other possible statuses or triggering of functions.

In an embodiment, in the conventional technology, the terminal usually performs facial recognition by capturing an image by using the front-facing camera. Such a conventional front-facing camera may be used in the present disclosure. In addition, the camera in the present disclosure is not limited to "front-facing in terms of position", and also includes some ingenious designs. For example, a camera being used in a rear position may be located in a front position through folding or deformation. The terminal includes but is not limited to a foldable phone. Alternatively, the face image of the user may be captured by using a peripheral image capture device. When the terminal is connected to an external camera, the external camera may also be understood as being included in the terminal.

Specifically, the camera may include one or more of an RGB camera, a depth camera, an NIR (Near infrared) near infrared camera, a hyperspectral camera, or a thermal imaging camera. The RGB camera can capture an image including three channels: red, green, and blue. The NIR camera is used to capture an infrared image in low light, is adapted to some low-illumination environments, and provides more image detail information. The depth camera can increase depth information of a face, where increased depth information details of an image can meet more refined analysis requirements, such as an anti-counterfeit requirement and a 3D face analysis requirement. The hyperspectral camera or the thermal imaging camera can increase vital sign information reflected by a face.

The images captured by the foregoing cameras may be data used for both identity recognition and facial attribute analysis. However, image information reflected by the images is different. Further, there are a plurality of image obtaining manners in the present disclosure. This is an innovation of the present disclosure.

For example, a user identity may be recognized based on an RGB face image captured by the RGB camera. As information analysis assistance, one or more types of images: a face depth image captured by the depth camera, an NIR face image captured by the NIR camera, a face hyperspectral image captured by the hyperspectral camera, or a face thermal imaging image captured by the thermal imaging camera may be further used for identity recognition or facial attribute analysis. There may be at least one used face image of each type, and a specific quantity of images used for analysis may be specified based on a network structure or system. This is not limited in the present disclosure. For ease of subsequent description, cameras that capture images used to analyze a user identity may be understood as a first set of cameras, and face images captured by the first set of cameras at any time when the screen is woken up may be understood as a first set of face images. It should be understood that the first set of cameras includes one or more of the RGB camera, the depth camera, the near infrared camera, the hyperspectral camera, or the thermal imaging camera. There may be a plurality of specific quantities, arrangement manners, and image obtaining manners for each type of camera. This is not limited in the present disclosure.

For another example, a facial attribute of the user may be analyzed based on the RGB face image captured by the RGB camera. As information analysis assistance, one or more types of images: the face depth image captured by the depth camera, the NIR face image captured by the NIR camera, the face hyperspectral image captured by the hyperspectral camera, or the face thermal imaging image captured by the thermal imaging camera may be further used for facial attribute analysis. There is at least one face image of each type, and a specific quantity of images used for analysis may be specified based on a network structure or system. This is not limited in the present disclosure. It can be learned that the images captured by the first set of cameras may be reused for analyzing the facial attribute of the user, and more or fewer images may be used for analyzing the facial attribute than for identity recognition. This is not exhaustively listed in this embodiment. For ease of subsequent description, a set of cameras other than the first set of cameras in the cameras that capture the images used for analyzing the facial attribute may be understood as a second set of cameras, that is, the second set of cameras may be understood as a subset of cameras other than the first set of cameras in all cameras in the terminal. Face images captured by the second set of cameras at any time when the screen is woken up may be understood as a second set of face images. There may be a plurality of types, specific quantities, and image obtaining manners for cameras in the second set of cameras. This is not limited in the present disclosure. In an embodiment, images used for analyzing the facial attribute of the user may be more abundant than images used for user identity recognition.

In this step, when an operation of capturing a face image is performed, the image may be captured by using different camera configurations based on a time factor difference, a geographical location factor difference, and an ambient light factor difference. For example, only the conventional RGB camera may be used to capture an image. Alternatively, the RGB camera and the depth camera may be used to capture an image, where the depth camera may include a structured light component, a TOF component, or the like. Alternatively, the RGB camera and the near infrared camera may be used. Alternatively, the RGB camera and the hyperspectral camera may be used. Alternatively, the NIR camera may be used. The foregoing provides merely possible implementation examples. This is related to a specific arrangement manner and a specific invoking manner of cameras of the terminal, and this is not exhaustively listed and is not limited either in the present disclosure.

In this step, when an operation of capturing a face image is performed, the image may alternatively be captured by using different camera configurations in a manner preset by the user or the system.

In a specific implementation process, the terminal may perform environment detection, and determine a to-be-invoked camera based on a detection result. If a photosensitive system of the terminal detects that an ambient environment is in a dark light condition, only the near infrared camera may be enabled or both the RGB camera and the near infrared camera may be enabled to obtain an image. For example, based on time, if it is detected that the time is morning or evening, one or more of the RGB camera, the depth camera, the near infrared camera, the hyperspectral camera, and the thermal imaging camera may be invoked to capture an image to analyze a health status, and the like of the user.

In an embodiment, in different environments and in different time periods, different camera combinations may be triggered to capture a face image of the user. This is related to a predefined image analysis method and a function configuration of the camera.

In a specific implementation process, the user or the terminal may alternatively preset a camera to be invoked during face unlocking and subsequent facial attribute analysis. For example, the terminal may set in advance that, during face unlocking, only the RGB camera is enabled, or only the near infrared camera is enabled, or both the RGB camera and the near infrared camera are enabled, to obtain an image. This is not exhaustively listed in this embodiment.

In addition, if no face is detected, a current running status of the terminal may be maintained. The present disclosure sets no limitation on a specific case in which the terminal does not detect a face, and on other possible statuses or triggering of functions. Specifically, when the user performs face unlocking, a preview stream of the face may not be displayed on the screen, or a preview stream corresponding to the face may be displayed. This may be specified based on a requirement.

Step 42: Determine whether the face image corresponds to a target user.

Steps such as face detection, key point locating, face correction (alignment), liveness detection, and feature extraction and comparison are performed on the face image (for example, the first set of face images) that is captured in step 42 and that is used for identity recognition, to determine identity information of the user. Face detection, key point locating, and feature extraction and comparison may be implemented in a manner such as a deep neural network or another type of algorithm in the conventional technology. Face correction (alignment) and liveness detection may be implemented by using the deep neural network or another conventional algorithm. Feature extraction may be implemented by using a trained facial recognition network, and an extracted feature is compared with a facial feature of a registered user, to determine whether a detected face image matches a registered target user. The facial recognition network may be any classification network such as a residual network.

Figure 5:
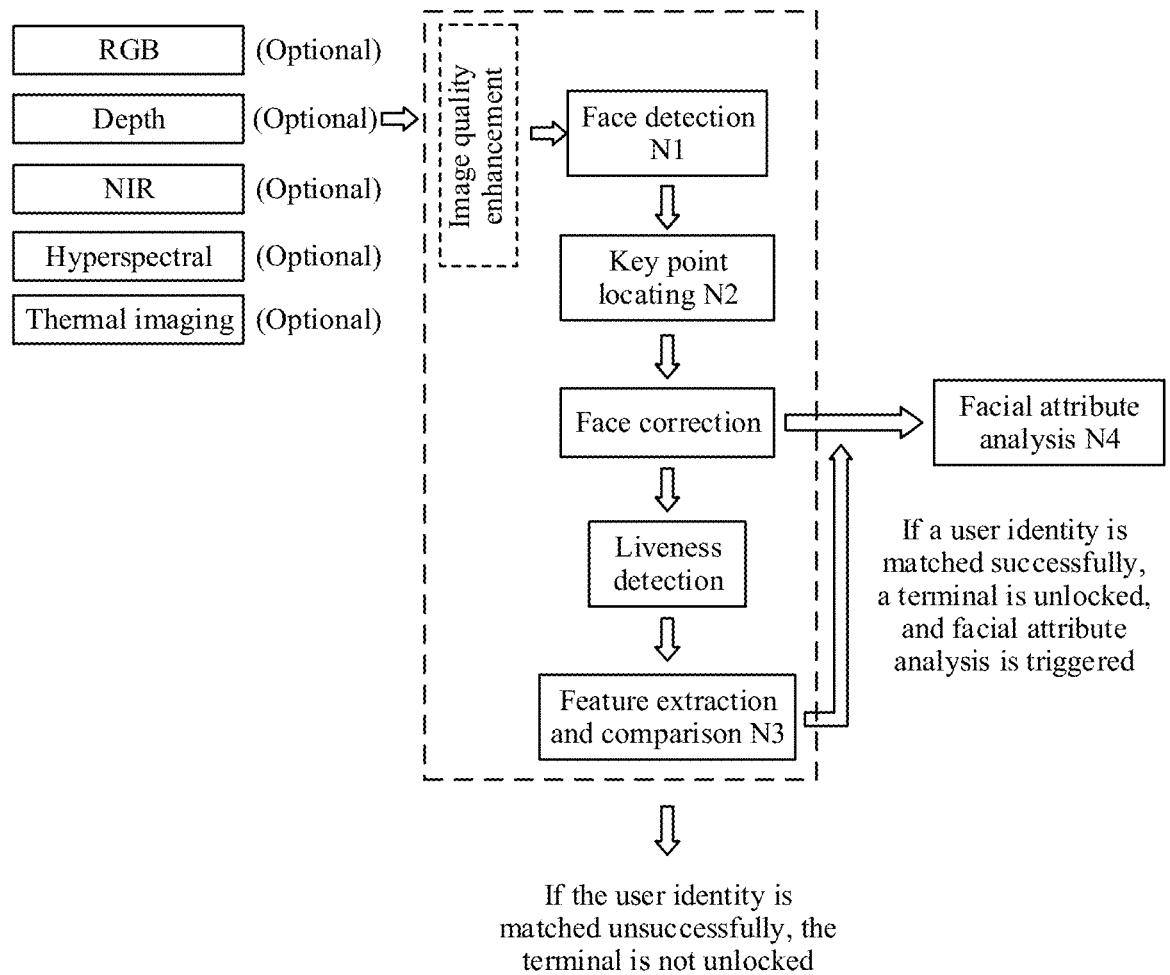
FIG. 5 is a signal flow diagram of image processing according to an embodiment of the present disclosure.

Refer to FIG. 5. In a specific implementation process, the face image captured by the terminal during face unlocking may include one or more of the RGB image, the near infrared image, the depth image, the hyperspectral image, or the thermal imaging image. The captured face image may be input into a trained face detection network N1 to obtain a position of the face; then a position of a face box that is obtained through detection is input into a trained key point locating network N2 to obtain position information of a face key point; a corrected face image is obtained based on the position information of the face key point by using a face correction method (for example but not limited to affine transformation); and finally, face cropping and size adjustment are performed on the corrected image. The face image obtained after the foregoing processing (preprocessing) may be used as an input for a facial recognition network N3 and may also be used as an input for a facial attribute recognition network N4.

An image quality enhancement function unit is configured to perform conventional image quality enhancement processing, for example, operations such as denoising, deblurring, and resolution improvement.

The face detection network N1 may obtain position information of the face in the captured image based on a common detection network such as Cascade CNN or YOLO.

The key point locating network N2 may obtain position information of a preset key point of the face in the face image based on a regression neural network.

A face correction function unit is configured to correct the face image by using a method such as affine transformation based on face detection and key point locating.

A liveness detection function unit is configured to determine, through liveness detection, whether the user is a real live person, so as to effectively resist common non-live spoofing means such as photos, masks, and sculptures.

A feature extraction and comparison network N3 extracts, based on a feature extraction network, a feature from the face image obtained after the foregoing preprocessing, and compares the feature with the facial feature of the registered user, so as to determine whether the face image matches the registered user. If a determining result is that the face image matches the user, the preprocessed image is triggered to be input into the N4 network for facial attribute recognition. This is another innovation of the present disclosure.

A facial attribute analysis network N4 performs attribute analysis on the preprocessed face image based on the facial attribute analysis network, to obtain probabilities of different degrees of each attribute or a specific attribute, and further determine attributes such as emotion and health of the user. For details of facial attribute analysis, refer to step 44.

In a specific implementation process, there may be a plurality of registered users. Correspondingly, there may also be a plurality of faces of the registered users, and there may also be a plurality of recognizable user identities.

If the face image corresponds to the target user, step 43 and step 44 are performed.

If the face image does not correspond to the target user, an original running status of the terminal may be maintained. The present disclosure sets no limitation on other possible statuses or triggering of functions.

In an embodiment, a recognition result in step 42 controls step 43 and step 44, to be specific, determines whether to perform unlocking and whether to perform facial attribute analysis, so as to determine whether to subsequently push content to the current user.

Step 43: The terminal performs an unlocking operation.

It should be understood that, when the facial recognition function of the terminal is triggered, the terminal may capture a face image. If the captured face image matches a registered user of the terminal, the terminal may perform the unlocking operation, that is, "face unlocking". In the conventional technology, face unlocking may be limited by time or a quantity of times. For example, if unlocking fails for 10 s or more than five times, the terminal is locked, unlocking is delayed, or another manner such as password unlocking is used.

In an embodiment, there may be a plurality of registered users, and if one of the registered users is matched, face unlocking can succeed.

It should be understood that, when facial recognition succeeds, the corresponding face image has been preprocessed, may be further buffered on the terminal, and may be read or invoked in subsequent use of the terminal.

Step 44: Determine a facial attribute of the user based on the first set of face images, where the user attribute includes at least one of an age, a gender, an emotion, or a health status, and the emotion and health may be common attributes.

It may be understood that, successful unlocking in step 43 triggers attribute analysis of the face image. If unlocking fails in step 43, attribute analysis may not be performed on the face image corresponding to an unlocking failure. This reduces resource consumption and processing power consumption. As an extension, if unlocking fails, the face image may be buttered as a record, and is used as a basis for subsequent surveillance data analysis.

Figure 6:
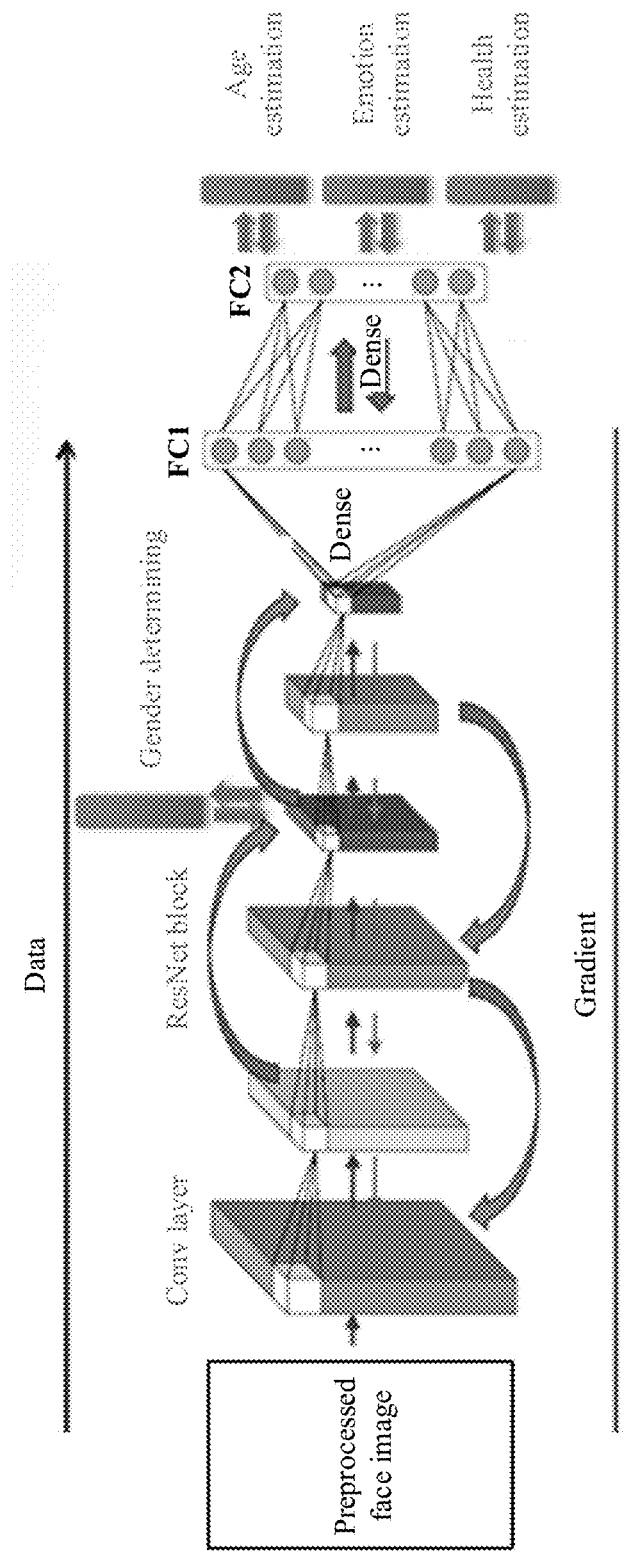
FIG. 6 is a schematic diagram of a facial attribute analysis network according to an embodiment of the present disclosure.

In a specific implementation process, if "identity authentication" on the first set of face images succeeds (the first set of face images matches a registered user of the terminal), a first set of face images that is obtained after preprocessing operations such as face detection, key point locating, and face correction are performed is input into a trained facial attribute recognition network. The facial attribute recognition network may be a multitasking deep neural network (as shown in FIG. 6, gender determining, age estimation, expression estimation, health estimation, and the like may be implemented by analyzing the input preprocessed face image). Any classification network, such as a residual network, may be selected to implement a basic network structure. The facial attribute of the user includes but is not limited to an expression (emotion), health, an age, a gender, and the like. More specifically, a preset category of the expression or emotion includes but is not limited to: neutrality, anger, disgust, fear, happiness, sadness, curiosity, smile, humor, surprise, excitement, astonishment, frown, disappointment, confusion, jealousy, indifference, boredom, rage, depression, pain, or the like; a preset category of the health includes but is not limited to: a degree of fatigue, a degree of nutrition, a degree of water deficiency, a degree of internal heat, or the like, where degrees of each health category may be further classified into a plurality of different degrees of normal, low, medium, and high; a preset age may be represented by using a specific number, an age range, a category such as "old, middle, young, teenage, or infant", or the like; and the gender may be represented by male or female. The preset category of the health attribute may alternatively include a body mass index (BMI), body fat, a blood pressure value, or the like, where the body mass index, the body fat, or the blood pressure value may be obtained by analyzing face image information. Types and degrees of facial attributes are not exhaustively listed and described herein.

In an embodiment, a recognized facial attribute may be accessed and obtained by using an application programming interface (application programming interface) unit. The storage may be temporary storage, long-term storage, or permanent storage, and storage time may be set by the system or selected by the user.

In an embodiment, a basic network structure for facial attribute recognition at a moment may be a ResNet (residual) network. The network generally includes an input layer, a convolutional layer, a fully-connected layer, and an output layer. Refer to a branch in FIG. 7. It is assumed that a moment at which unlocking succeeds is Tn, and a correspondingly captured face unlocking image (or image set) of the user is Xn. A facial attribute recognition result Yn at the moment may be obtained by using the foregoing defined deep convolutional network.

In an embodiment, a specific implementation of step 44 may include: determining the facial attribute based on only the face image captured in step 42 when face unlocking succeeds this time. This facilitates single-time recognition, and is easy to use. For example, face-based identity authentication on the first set of face images captured by the first set of cameras succeeds, and the first set of face images has been preprocessed. In this case, the result that "face-based identity authentication succeeds" triggers inputting of the preprocessed first set of face images into a preset facial attribute analysis network, to obtain an analysis result of the facial attribute.

In an embodiment, for a method for implementing step 44, refer to S1205 in the following description.

In an embodiment, a specific implementation of step 44 may include: determining the facial attribute based on the face image captured in step 42 when face unlocking succeeds this time, and performing more accurate facial attribute analysis by using an image that is captured when face unlocking succeeds this time and that includes more image details. For example, when the first set of cameras captures the first set of face images, accordingly, the second set of cameras of the terminal also captures the second set of face images. The first set of face images and the second set of face images almost correspond to a same face pose or are captured at a same moment. Face-based identity authentication on the first set of face images captured by the first set of cameras succeeds. It should be understood that both the first set of face images and the second set of face images have been preprocessed (the first set of face images and the second set of face images may be preprocessed together before being input into the facial recognition network N3). In this case, the result that "face-based identity authentication on the first set of face images succeeds" triggers inputting of the preprocessed first set of face images and the preprocessed second set of face images into the preset facial attribute analysis network, to obtain an analysis result of the facial attribute.

In an embodiment, a specific implementation of step 44 may include: determining the facial attribute of the user based on the face image captured in corresponding step 41 when face unlocking succeeds this time or based on a face image captured in a preset historical time period. It should be understood that the face image captured in the historical time period is a face image correspondingly captured when face unlocking succeeds in the historical time period. In addition, when there are a plurality of registered users of the terminal, the face image captured in the historical time period and the face image captured when face unlocking succeeds this time need to correspond to a same registered user. When there is only one registered user of the terminal, the face image captured in the historical time period includes one or more types of images captured when unlocking of the registered user succeeds. The result that "face-based identity authentication on the first set of face images succeeds" triggers inputting of the preprocessed first set of face images and a preprocessed face image captured in the preset historical time period (which may be a full set or a subset of face images captured when unlocking succeeds in the preset historical time period) into the preset facial attribute analysis network, to obtain an analysis result of the facial attribute. It should be understood that preprocessing of the face image captured in the preset historical time period may be performed simultaneously with preprocessing of the first set of face images or may be performed before preprocessing of the first set of face images, and the preprocessed images may be buffered on the terminal.

In an embodiment, a specific implementation of step 44 may include: determining the facial attribute of the user based on the face image captured in corresponding step 41 when face unlocking succeeds this time, an image that is captured when face unlocking succeeds this time and that includes more image details, and a face image captured in a preset historical time period. For example, the result that "face-based identity authentication on the first set of face images succeeds" triggers inputting of the preprocessed first set of face images, the preprocessed second set of face images, and a preprocessed face image captured in the preset historical time period (which may be a full set or a subset of face images captured when unlocking succeeds in the preset historical time period) into the preset facial attribute analysis network, to obtain an analysis result of the facial attribute.

In an embodiment, a specific implementation of step 44 may further include: determining a first facial attribute result based on the first set of face images; obtaining a facial attribute result of the current user in a preset historical time period; and determining the facial attribute of the user based on the first facial attribute result and the facial attribute result of the current user in the preset historical time period.

In an embodiment, a specific implementation of step 44 may further include: performing facial attribute analysis based on a full set or a subset of face images (which may include the face image captured this time) captured in step 41 in a preset time period. For example, the facial attribute is determined based on all corresponding face images in a preset time t that are captured when the face unlocking operation succeeds. t may be preset duration such as one hour or half an hour; or t may be a preset time period corresponding to morning, noon, or evening, or another user-defined time period. In this way, facial attribute recognition precision can be improved. To be specific, a facial attribute at a current moment is comprehensively determined based on an image of the user that is used for unlocking and that is captured in a preset previous period of time that includes the current moment. By performing analysis based on an overall attribute of the user in a historical period, content to be pushed subsequently can better meet a user requirement.

It should be understood that a full set or a subset of face images (which may include the face image captured this time) captured in step 41 in the historical time period may include one or more of an RGB image, a near infrared image, a depth image, a hyperspectral image, and a thermal imaging image. A category and a quantity of historical face images are not limited in this embodiment.

In a specific implementation process of facial attribute recognition, at least the following two facial attribute recognition solutions are available, and network structures of the solutions respectively correspond to a convolutional neural network CNN (Convolutional Neural Network) and a recurrent neural network RNN (Recurrent Neural Network).

Figure 7:
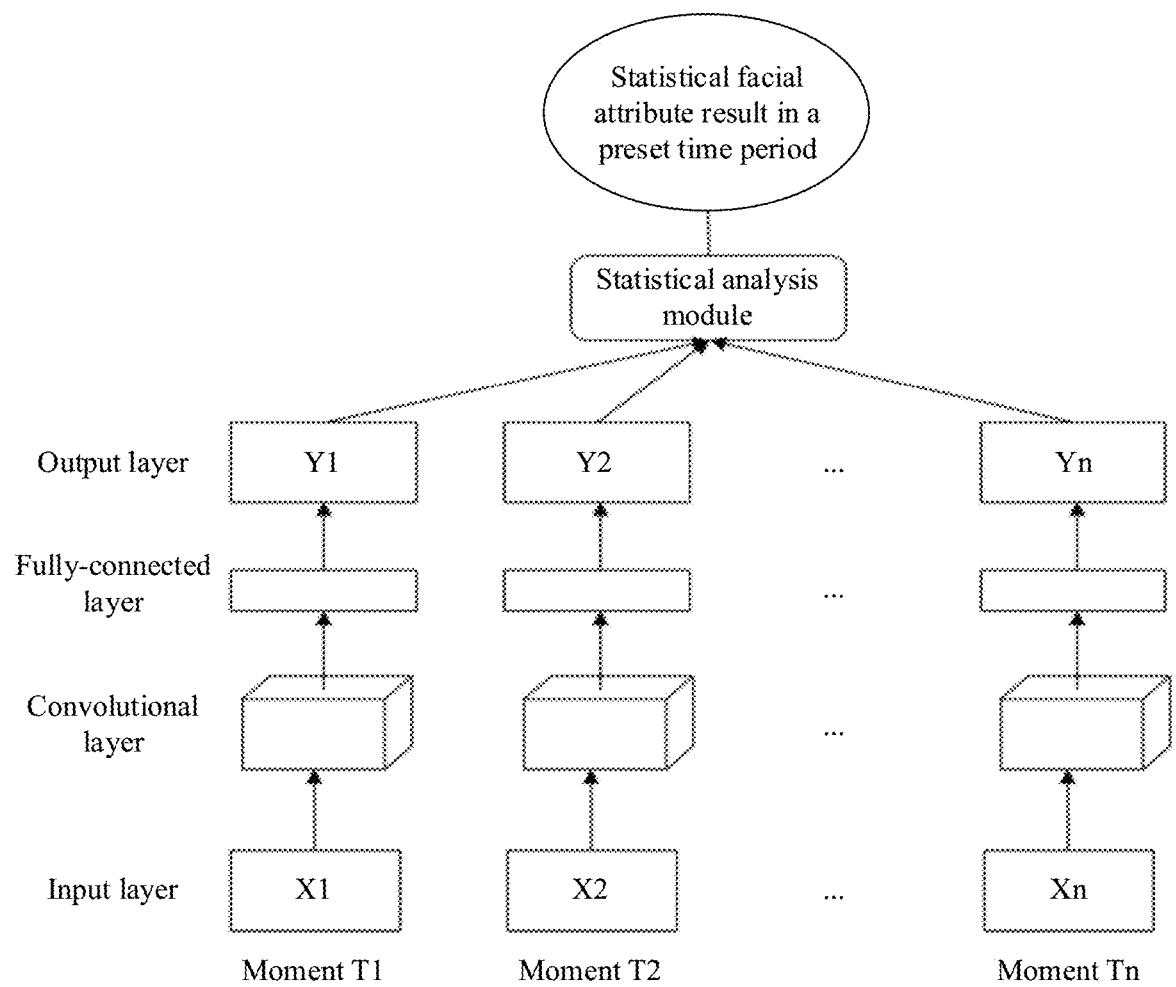
FIG. 7 is a schematic diagram of a facial attribute analysis method in a preset time period according to an embodiment of the present disclosure.

Solution 1: A preset time period t is specified. In the preset time period t previously starting from a moment Tn, a statistical facial attribute recognition result, that is, a comprehensive facial attribute result, is obtained by using a statistical analysis module by combining user facial attribute recognition results Y1, Y2, . . . , and Yn at different moments. Refer to FIG. 7.

Figure 8:
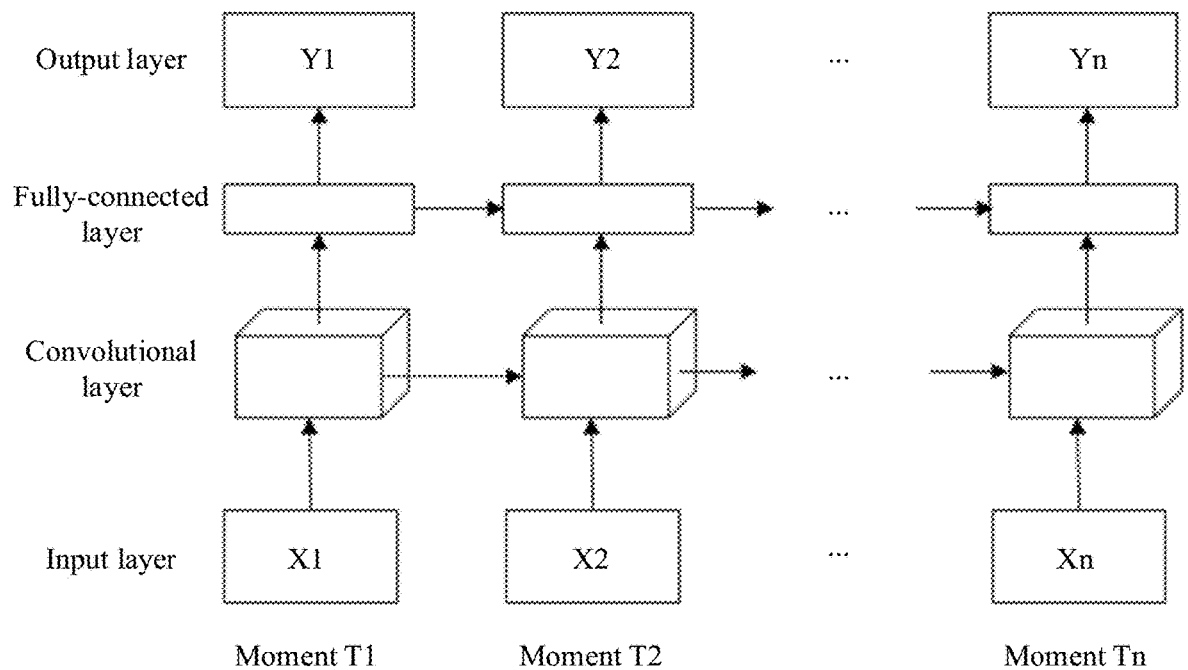
FIG. 8 is a schematic diagram of another facial attribute analysis method in a preset time period according to an embodiment of the present disclosure.

Solution 2: A used basic network structure is the RNN. The RNN is a deep neural network in the conventional technology, and is dedicated to processing time sequence information, that is, processing pieces of data that have a sequence and dependency. In the RNN, each neuron depends on an input at a previous moment in addition to an input of current information. As shown in FIG. 8, there are feedback connections between convolutional layers and fully-connected layers at different moments. The facial attribute recognition result Yn at the moment Tn is obtained by inputting face unlocking images X1, . . . , and Xn that are obtained in the preset time period t into a trained RNN network. Herein, Yn is used as the facial attribute recognition result in the preset time period t.

Step 45: Determine a to-be-pushed media resource based on the facial attribute of the user.

In a specific implementation process, after an emotion of the user is recognized, a related media resource that needs to be pushed, for example, music, a movie, a TV series, an article, travel information, a short video, a dynamic image, a microblog, news, or reminder information related to the current emotion, may be determined based on a category of the emotion. For example, if it is recognized that the emotion of the user is fear, a police dial-up interface or another emergency notice may be pushed.

In a specific implementation process, after the health status of the user is recognized, a description or a shopping link of a drug or a health care product that needs to be recommended may be targetedly determined based on the health status, or some related health articles, fitness information, and the like may be recommended for a health status prompt and suggestion. For example, if it is recognized that the user is pale, a prompt such as drinking water or eating fruit may be given, a suggestion or a recipe for improving the current health status may be provided, or first aid common knowledge may be provided.

In a specific implementation process, after the age of the user is recognized, a shopping link, a literary book, a travel item, a film and television work, a short video, a microblog, fitness information, news, or the like that needs to be recommended may be targetedly determined based on an age group.

In a specific implementation process, after the gender of the user is recognized, a shopping link, a literary book, a travel item, a film and television work, a short video, a microblog, news, or the like that needs to be recommended may be targetedly determined based on the gender.

In a specific implementation process, when it is determined, based on the captured face image, that the user attribute has one or more results or levels, there may be one or more to-be-pushed media resources. Further, a more accurate recommendation may be determined based on an intersection of recommendation content of the one or more to-be-pushed media resources.

In a specific implementation process, when it is determined, based on the captured face image, that the user attribute has one or more results or levels, there may be one or more to-be-pushed media resources. Further, related content may be recommended based on a priority or priorities of an attribute or attributes of the one or more to-be-pushed media resources. For example, if a priority of the emotion is higher than a priority of the gender and a priority of the age, a media resource determined based on the emotion is preferentially pushed.

In a specific implementation process, when it is determined, based on the captured face image, that the user attribute has one or more results or levels, there may be one or more to-be-pushed media resources. Further, related content may be recommended based on a media resource corresponding to an attribute that the user has subscribed to. For example, if the user has subscribed to "famous quotes" or "travel stories" in a media resource corresponding to the emotion, the two types of articles are preferentially recommended.

In a specific implementation process, when it is determined, based on the captured face image, that the user attribute has one or more results or levels, there may be one or more to-be-pushed media resources. Further, appropriate clustering may be performed based on attributes such as an application type and a theme type, to determine that a type of media resource needs to be pushed.

In a specific implementation process, when it is determined, based on the captured face image, that the user attribute has one or more results or levels, there may be one or more to-be-pushed media resources. Further, an appropriate to-be-pushed media resource may be determined based on a display size of the screen.

In a specific implementation process, when it is determined, based on the captured face image, that the user attribute has one or more results or levels, there may be one or more to-be-pushed media resources. Further, an appropriate to-be-pushed media resource may be determined based on a media resource presentation manner (for example, a size, a shape, and display duration).

In a specific implementation process, when it is determined, based on the captured face image, that the user attribute has one or more results or levels, there may be one or more to-be-pushed media resources. Further, an appropriate to-be-pushed media resource may be determined based on a size of a storage space of the media resource.

In a specific implementation process, the terminal may preset a correspondence between a local media resource and a category or a level of an emotion or health. After analyzing a facial attribute, the terminal may obtain corresponding media resources, and select a media resource according to some rules. The rules include but are not limited to rules mentioned above.

In an embodiment, the media resource may be a local media resource, or may be a web or cloud media resource that can be found by the terminal based on a facial attribute result. It should be understood that there may be a plurality of media resources corresponding to a facial attribute result, and the to-be-pushed media resource may be understood as at least one of the plurality of media resources.

In an embodiment, an application program on the terminal may obtain the facial attribute through the API, and may associate the recognized facial attribute (which may be obtained through recognition this time or based on overall analysis of data in the historical period) with content that is currently being displayed, content that has recently been displayed, or content that is instantly searchable, where the association may be stored in a user profile. The application maintains a user profile that is based on a user. A relationship between an emotion of the user and displayed content may be established in the user profile. For example, the user profile may record five different content items viewed by the user: a photo, an article, a status update, a video, and an advertisement. Each content item includes a unique identifier, a content type, content publisher information, and a detected user emotion type. In this way, the user profile collects an emotion response or a health response made by the user to content, and is used to recommend new content to the user in the future.

Step 46: Push the media resource in an interface displayed after the terminal is unlocked.

It should be understood that, in the conventional technology, after the terminal is unlocked, the terminal displays a home screen or an interface in which the terminal last stays. However, according to the present disclosure, attribute analysis of the face image is triggered during unlocking, the to-be-pushed media resource is further determined, and during face image unlocking, the to-be-pushed media resource or a push window of the media resource is displayed immediately in the interface displayed after unlocking.

In a specific implementation process, the to-be-pushed media resource or the push window of the media resource may be atop the interface displayed after unlocking. The to-be-pushed media resource or the push window of the media resource may float in the interface displayed after unlocking, that is, displayed in a partial area of the interface displayed after unlocking.

In an embodiment, the media resource may be randomly pushed, or may be preferentially pushed based on a priority of a content category. For example, if news is preferentially pushed, then a short video is pushed, and then a shopping link is recommended, news corresponding to a user attribute is preferentially pushed.

In an embodiment, when the media resource is pushed in the interface displayed after the terminal is unlocked, an option of an instruction indicating whether to receive the pushed media resource may be further displayed; and when a push confirmation instruction of the user is received, a push link of the media resource is jumped to, or a pushed media resource is played or browsed, where a manner of jumping to the push link includes but is not limited to a manner of jumping to a related app, a web page link, a mini program, or the like; or when an instruction indicating that the user does not receive the push, pushing of the media resource is canceled.

In an embodiment, the interface displayed after unlocking may be a main system interface, and the to-be-pushed media resource or the push window of the media resource may appear in the main system interface or float in the main system interface.

In an embodiment, the interface displayed after unlocking directly displays the to-be-pushed media resource or the push window of the media resource, for example, directly plays a video, displays news, displays a reminder, displays a suggestion, displays a shopping interface, or jumps to an interface of an app. This is not exhaustively listed and described herein.

In an embodiment, the interface displayed after unlocking may directly jump to a leftmost screen, and a recommendation bar of each category in the leftmost screen may systematically push the determined media resource for the user to browse or further select.

In an embodiment, the interface displayed after unlocking may jump to an application based on a default setting or a preset setting, and the determined media resource is pushed in a display interface of the application.

In an embodiment, media resource push time may last for preset duration too, where a value of too may be set by the system or the user, for example but not limited to 2 s, 3 s, 5 s . . . ; and after the pushed media resource is displayed for the duration too, the pushed media resource may automatically disappear from the display interface, or may be hidden and run in the background, or may provide more function options for the user for subsequent operations.

In an embodiment, when the system or the application program pushes the media resource in the interface displayed after the terminal is unlocked, the media resource may be displayed in a floating window manner, or may be displayed in a full screen mode. A "vacant" area (to be specific, no application icon or function icon is included) may be determined in the current interface displayed after unlocking, and a proper position is determined in the "vacant" area for layout display. In addition, a shape of a push window for layout display includes but is not limited to a square, a circle, a triangle, an irregular shape, or the like.

In addition, in a specific implementation process, the interface displayed after the terminal is unlocked may further display an analysis result of a user attribute.

In an implementation process, after the terminal performs the unlocking operation, and the pushed content is displayed in the interface displayed after the terminal is unlocked, to-be-pushed content is no longer determined in a preset time period based on the user attribute.

In addition, in a specific implementation process, according to the foregoing method, identity (ID) information of a currently unlocking user is obtained through facial recognition; and a facial attribute recognition result may be further obtained based on a face image obtained during facial recognition. The terminal may further associate the user identity with the facial attribute recognition result, to implement system-level user facial attribute management. Because the facial attribute recognition result has the "identity", facial attribute management of a plurality of users may be implemented for a same terminal device at the same time. In addition, unified system-level facial attribute management may also be implemented between different terminal devices through the cloud. Based on implementation of system-level facial attributes, facial attributes are statistically analyzed in real time or in a long period of time, and a corresponding system or third-party API is invoked, to implement personalized recommendation and related event reminding, and the like.

According to the content push method provided in the present disclosure, in an application scenario in which "facial recognition" is used for unlocking a terminal, facial attribute analysis is further triggered by successful facial recognition; a current referable facial attribute of a user is determined; a closely related media resource is determined based on the facial attribute (an emotion, a health status, an age, a gender, or the like); and the media resource is pushed in an interface displayed after the terminal is unlocked. Some appropriate media resources are targetedly pushed to the user based on the emotion or the health status of the user immediately when the user uses the terminal, so that subjective experience of using the terminal by the user is improved. In addition, an image for facial recognition unlocking can be reused for facial attribute analysis. This improves terminal resource utilization and reduces power consumption.

Based on the content push method provided in the foregoing embodiments, an embodiment of the present disclosure provides a content push apparatus 900. The apparatus may be applied to a plurality of terminal devices, and may be any implementation form of the terminal 100, for example, a terminal that includes a photographing function.

Figure 9:
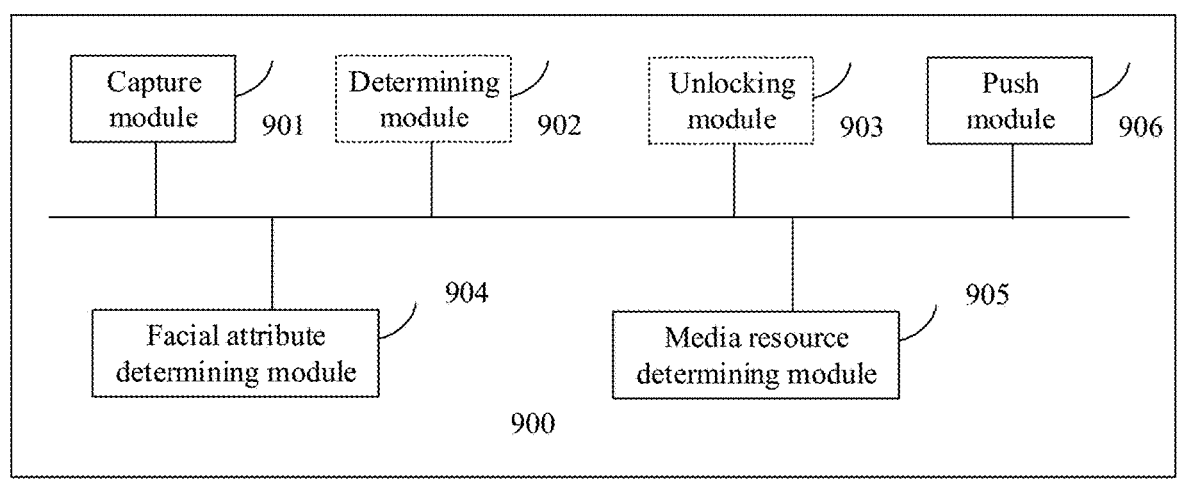
FIG. 9 is a schematic diagram of a content push apparatus according to an embodiment of the present disclosure.

In an embodiment, the terminal may include a first set of cameras, the first set of cameras includes one or more of an RGB camera, a depth camera, a near infrared camera, a hyperspectral camera, or a thermal imaging camera. Refer to FIG. 9. The apparatus includes the following modules.

A capture module 901 is configured to obtain an image, that is, may take a photo. The capture module 901 is configured to, when the terminal is in a screen-locked state and an off-screen is woken up, capture a first set of face images of a user by using the first set of cameras. The module is configured to perform the method in step 41 in the foregoing example and an alternative method, and the module may be implemented by a processor by invoking corresponding program instructions in a memory, to control the camera to capture the image.

A determining module 902 is configured to determine whether the first set of face images matches a registered user. The module is configured to perform the method in step 42 in the foregoing example and an alternative method, and the module may be implemented by the processor by invoking corresponding program instructions in the memory to implement a corresponding algorithm.

An unlocking module 903 is configured to perform an unlocking operation if the first set of face images matches the registered user. The module is configured to perform the method in step 43 in the foregoing example and an alternative method, and the module may be implemented by the processor by invoking corresponding program instructions in the memory.

A facial attribute determining module 904 is configured to determine a facial attribute of the user based on the first set of face images if the first set of face images matches the registered user, where the facial attribute includes at least one of an age, a gender, an emotion, or a health status. The module is configured to perform the method in step 44 in the foregoing example and an alternative method, and the module may be implemented by the processor by invoking corresponding program instructions in the memory.

A media resource determining module 905 is configured to determine a to-be-pushed media resource based on the facial attribute. The module is configured to perform the method in step 45 in the foregoing example and an alternative method, and the module may be implemented by the processor by invoking corresponding program instructions in the memory.

A push module 906 is configured to push the media resource in an interface displayed after the terminal is unlocked. The module is configured to perform the method in step 46 in the foregoing example and an alternative method, and the module may be implemented by the processor by invoking corresponding program instructions in the memory and external network data.

The foregoing specific method examples, explanations and descriptions of technical features in the embodiments, and extensions of a plurality of implementations are also applicable to method execution on the apparatus, and details are not described in the apparatus embodiment.

Example 2: Facial Attribute Analysis Triggered by Wakeup of a Locked Screen

Figure 10:
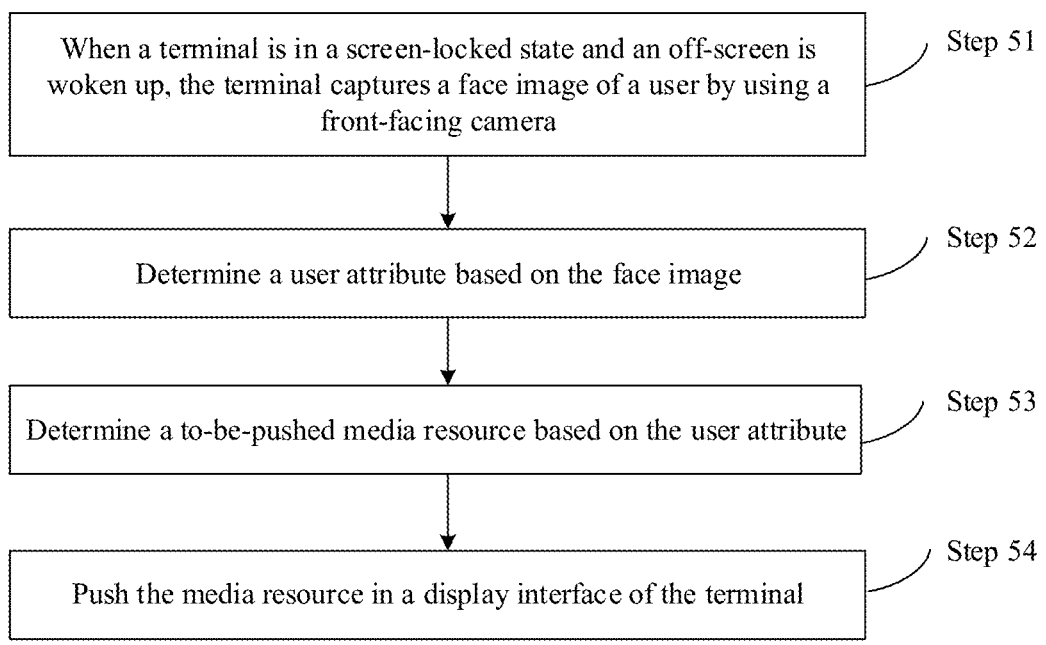
FIG. 10 is a flowchart of a content push method according to an embodiment of the present disclosure.

In some scenarios, face unlocking sometimes may be time-consuming. Wakeup of the off-screen can directly trigger face image capture and facial emotion analysis, so that a media resource can be pushed earlier. The present disclosure provides an implementation. The implementation is applied to a terminal, the terminal includes a first set of cameras, and the first set of cameras includes one or more of an RGB camera, a depth camera, a near infrared camera, a hyperspectral camera, or a thermal imaging camera. Refer to FIG. 10. The implementation includes the following steps.

Step 51: When the terminal is in a screen-locked state and an off-screen is woken up, capture a first set of face images of a user by using the first set of cameras. For specific implementation of the method, refer to implementation of the related method in step 41.

Step 52: Determine a facial attribute of the user based on the first set of face images, where the facial attribute includes at least one of an age, a gender, an emotion, or a health status. For a method for determining the facial attribute of the user, refer to the related method in step 44. For example, the facial attribute of the user may be determined not only based on the first set of face images.

Step 53: Determine a to-be-pushed media resource based on the facial attribute. For a method for determining the media resource based on the facial attribute of the user, refer to the related method in step 45.

Step 54: Push the media resource in a display interface of the terminal. The media resource may be pushed after unlocking, or may be pushed in an unlocking process. For example, in a face unlocking process, a media resource that matches a current facial attribute of the user may be displayed in an unlocking interface, for example, a picture, an animation, news, or a short article. Further, after face unlocking succeeds, the user can normally use all programs of the terminal. In an embodiment, the unlocking screen is not janky, or an unlocking success prompt is not visible to the user. For example, the user is currently reading a short article. If face unlocking succeeds in the reading process, the short article may still be displayed in the display interface of the terminal, and after reading, the user can continue to use the terminal normally by using any executable operation instruction. If face unlocking of the user fails, only the foregoing media resource can be displayed in the display interface of the terminal, and no more functions (except an emergency function) can be used. For a method for pushing the media resource, refer to the related method in step 46.

The specific method, explanations and descriptions of related technical features in the embodiment, and a plurality of implementations and extensions in the example 1 are also applicable to method execution in the example 2, and details are not described in the embodiment in the example 2.

Based on the content push method provided in the foregoing embodiment, functions of modules in the content push apparatus 900 provided in this embodiment of the present disclosure may alternatively be as follows.

A capture module 904 is configured to obtain an image, that is, may take a photo. The capture module 904 is configured to, when the terminal is in a screen-locked state and an off-screen is woken up, capture a first set of face images of a user by using the first set of cameras. The module is configured to perform the related method in step 41 or step 51 in the foregoing example and an alternative method, and the module may be implemented by a processor by invoking corresponding program instructions in a memory, to control the camera to capture the image.

A facial attribute determining module 904 is configured to determine a facial attribute of the user based on the first set of face images if the first set of face images matches a registered user, where the facial attribute includes at least one of an age, a gender, an emotion, or a health status. The module is configured to perform the related method in step 44 or step 52 in the foregoing example and an alternative method, and the module may be implemented by the processor by invoking corresponding program instructions in the memory.

A media resource determining module 905 is configured to determine a to-be-pushed media resource based on the facial attribute. The module is configured to perform the related method in step 45 or step 53 in the foregoing example and an alternative method, and the module may be implemented by the processor by invoking corresponding program instructions in the memory.

A push module 906 is configured to push the media resource in an interface displayed after the terminal is unlocked. The module is configured to perform the related method in step 46 or step 54 in the foregoing example and an alternative method, and the module may be implemented by the processor by invoking corresponding program instructions in the memory and external network data.

The foregoing specific method examples, explanations and descriptions of technical features in the embodiments, and extensions of a plurality of implementations are also applicable to method execution on the apparatus, and details are not described in the apparatus embodiment.

According to the apparatus provided in the present disclosure, in an application scenario in which "facial recognition" is used for unlocking a terminal, facial attribute analysis is further triggered by successful facial recognition; a current referable facial attribute of a user is determined; a closely related media resource is determined based on the facial attribute (an emotion or a health status); and the media resource is pushed in an interface displayed after the terminal is unlocked. Some appropriate media resources are targetedly pushed to the user based on the emotion or the health status of the user, so that subjective experience of using the terminal by the user is improved. In addition, an image for facial recognition unlocking can be reused for facial attribute analysis. This improves terminal resource utilization and reduces power consumption.

Example 3: Content Recommendation Management (Push after Unlocking)

Figure 11:
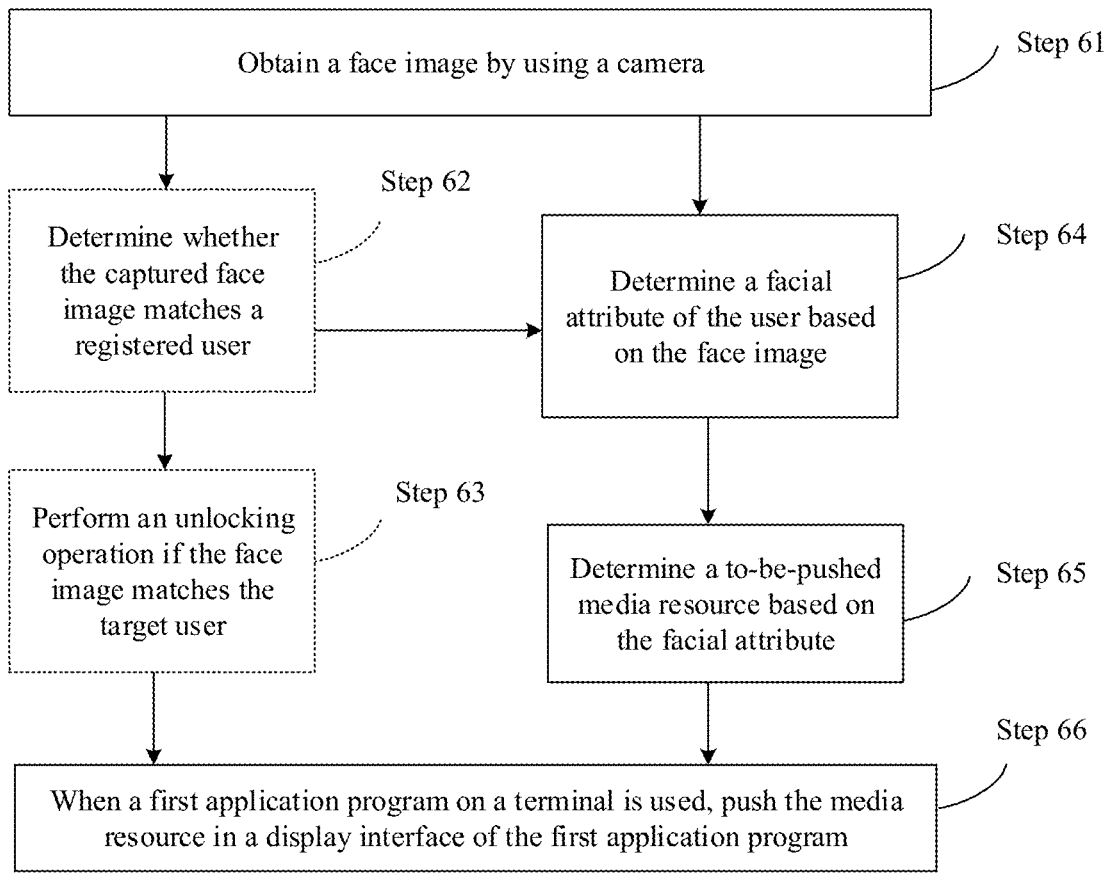
FIG. 11 is a flowchart of another content push method according to an embodiment of the present disclosure.

In some scenarios, after user unlocking succeeds, a resource may not be pushed immediately, and a media resource may be pushed when a user uses some applications. The present disclosure provides an implementation. The implementation is applied to a terminal, and the terminal includes a camera. Refer to FIG. 11. The implementation includes the following steps.

Step 61: Obtain a face image by using the camera.

In an embodiment, the terminal may include one or more of an RGB camera, a depth camera, a near infrared camera, a hyperspectral camera, or a thermal imaging camera. The obtained face image may correspondingly include one or more types of face images.

In an embodiment, the camera may obtain the face image during face unlocking, for example, obtain the face image when the terminal is in a screen-locked state and an off-screen is woken up. In this scenario, the foregoing method may further include steps 62 and 63.

In an embodiment, in a process in which a user uses the terminal, the camera may obtain the face image when receiving an instruction that is entered by the user for triggering photographing or when a condition for triggering photographing is met.

In an embodiment, the camera may obtain the face image when the terminal is woken up from a screen-off state. It should be understood that the screen-off state is not necessarily a locked state.

Further, a photographing unit may capture a face image at a fixed time interval TOO in a process of using the terminal. The photographing unit may alternatively capture a face image when the user uses an application, and this may be triggered by but not limited to the application.

For some optional implementations, refer to the method in step 41 and another alternative method.

This step may be performed by the capture module 901.

Step 62: Determine whether the captured face image matches a registered user.

In an embodiment, the terminal has a plurality of registered users. The plurality of registered users may share one facial attribute profile, or each registered user corresponds to one facial attribute profile. The facial attribute profile is used to store a face image or a facial attribute analysis result. Facial attributes of different registered users at different moments may be recorded and managed in the facial attribute profile.

For some optional implementations, refer to the method in step 42 and another alternative method.

This step may be performed by the determining module 902.

Step 63: Perform an unlocking operation if the captured face image matches the registered user.

For some optional implementations, refer to the method in step 43 and another alternative method.

This step may be performed by the unlocking module 903.

Step 64: Determine a facial attribute of the user based on the face image.

In an embodiment, the facial attribute may be sent to at least one application program on the terminal in real time, or may be stored on the terminal and is to be invoked in a subsequent process of using an application program.

In an embodiment, the facial attribute of the user may be determined based on the face image and a face image of the current user that is captured in a preset historical time period.

In an embodiment, a first facial attribute result is determined based on the face image; a facial attribute result of the current user in a preset historical time period is obtained; and the facial attribute of the user is determined based on the first facial attribute result and the facial attribute result in the preset historical time period.

For some optional implementations, refer to the method in step 44 and another alternative method.

This step may be performed by the facial attribute determining module 904.

Step 65: Determine a to-be-pushed media resource based on the facial attribute of the current user.

The terminal may associate the facial attribute with an application program, such as a leftmost screen application program or another application program, including an application program frequently used by the user, an application program with content pushing, or an application program currently being started and used.

In an embodiment, in a process of starting or using the application program, the application program may invoke a facial attribute result or a statistical facial attribute result, where the facial attribute result or the statistical facial attribute result is last obtained by the terminal. Further, the application program determines, from resources that can be found or invoked by the application program, a media resource that best matches the facial attribute of the current user.

For a method for determining the to-be-pushed media resource based on the facial attribute, refer to the method in step 45 and another alternative method.

This step may be performed by the media resource determining module 905.

Step 66: When a first application program on the terminal is used, push the media resource in a display interface of the first application program.

In an embodiment, the display interface of the application program may be arranged or adjusted based on the media resource that best matches the facial attribute of the current user. In an embodiment, the media resource that best matches the facial attribute of the current user may be more prominently displayed to the user.

In an embodiment, for example, a leftmost screen is rearranged. The leftmost screen may be an interface displayed by sliding left from a home screen. The leftmost screen integrates shortcut display pages of applications such as application suggestions, sports and health, life service, news, video, and music, and may automatically generate various reminder cards of AI Tips. Specifically, after obtaining the facial attribute of the user (for example, obtaining the facial attribute through an API), the leftmost screen may arrange application shortcuts of media resources that match the current facial attribute, for example, application suggestions, sports and health, life service, news, video, and music, and present arranged application shortcuts in the display interface. For example, when it is detected that a health status of the user is not good, a health suggestion may be displayed in the leftmost screen, or an exercise or health app (application) may be pushed in a display bar. For example, when it is detected that an emotion of the user is not good, a humor dynamic image, a recommended joke, or a recommended comedy video may be displayed in the leftmost screen, or a comedy application is recommended and displayed in an application bar.

In an embodiment, after an app that is being used by the user obtains the facial attribute (for example, obtains the facial attribute through an API), a media resource that matches the facial attribute of the current user may be arranged in a display interface of the application program.

In an embodiment, after an unused application program obtains the facial attribute (for example, obtains the facial attribute through an API), a determined media resource that matches the facial attribute of the current user is arranged in a display interface of the application program, and may be directly presented when the user starts the application.

In an embodiment, the first application program may arrange the display interface of the first application program based on the to-be-pushed media resource. For example, the to-be-pushed media resource is displayed in a function bar, a content list, or a group of messages, or is directly displayed, or may be displayed in a scrolling mode. Because interface designs and functions vary greatly between different application programs, specific presentation of an interface is not described in detail in the present disclosure. This step may include all content presentation manners or content interaction interfaces in the conventional technology.

For some optional push methods, refer to some methods in step 45 and other alternative methods.

This step may be performed by the push module 906.

In the conventional technology, the leftmost screen is usually in a default mode, or displays a recently used application, or is in a random mode. Page layouts for various application programs are also designed in a default mode. Therefore, a layout manner and a content push manner are not targetedly designed for an emotion and a health status of a user. According to the present disclosure, a recommendation is made based on a facial attribute of a user without being triggered by the user, so that presentation of an application program is more user-friendly and intelligent.

The specific method, explanations and descriptions of related technical features in the embodiment, and a plurality of implementations and extensions in the example 1 and the example 2 are also applicable to method execution in the example 3, and details are not described in the embodiment in the example 3.

The foregoing specific method examples, explanations and descriptions of technical features in the embodiments, and extensions of a plurality of implementations are also applicable to method execution of the modules in the apparatus, and details are not described in the apparatus embodiment.

Example 4: Facial Attribute Profile Management

According to a facial attribute recognition method in the conventional technology, a real health or emotion status of a user cannot be accurately reflected based on only an image that is obtained once. Accordingly, recommended content cannot meet an actual requirement of the user, and consequently, content recommendation reliability is not high. The following uses an expression (emotion) in a facial attribute as an example for description. It should be understood that the following implementation method is not limited to the expression, but may include various cases of the facial attribute. This example may be used in a process in which a user performs face unlocking, or may be used in a process of using a program. This example may include any possible scenario in which the user uses a terminal.

Figure 12:
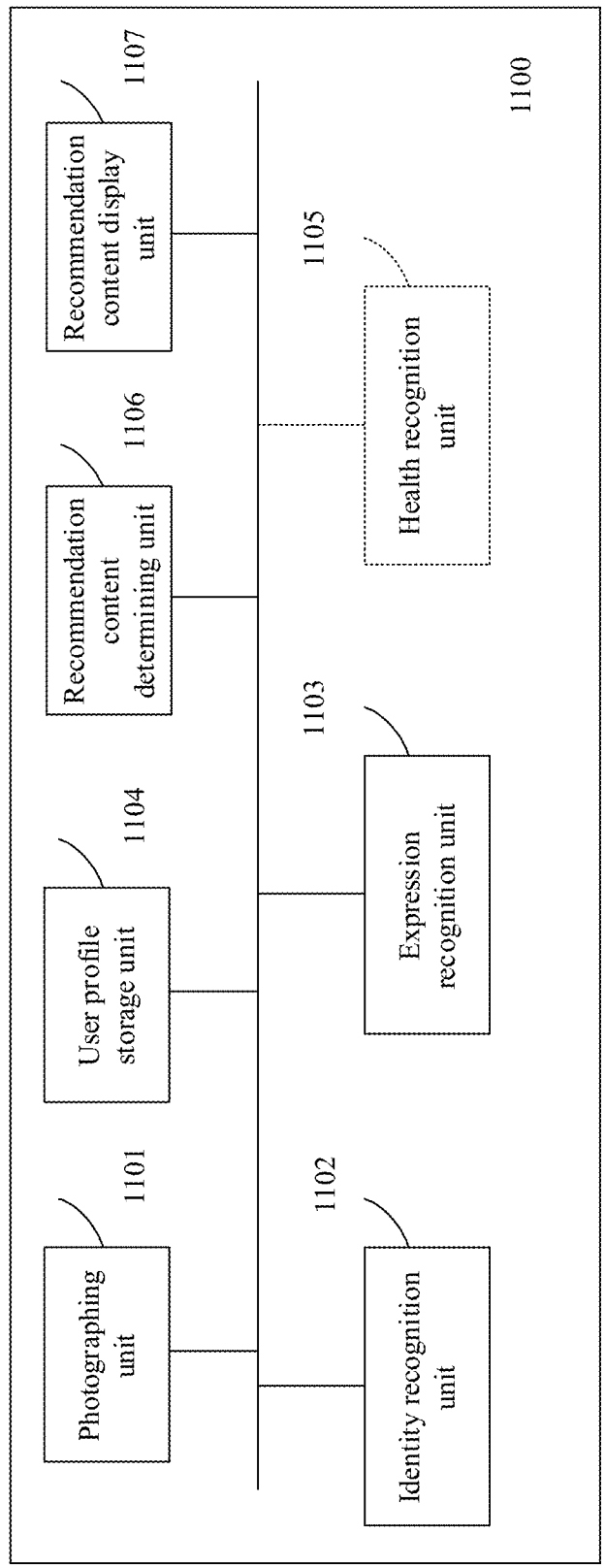
FIG. 12 is a schematic diagram of a user attribute profile management apparatus according to an embodiment of the present disclosure.

For an optional embodiment of the present disclosure, refer to FIG. 12. FIG. 12 shows a user attribute profile management apparatus 1100. The apparatus includes the following units.

A photographing unit 1101 is configured to obtain a face image. For specific implementation, refer to a related function of the capture module 901.

An identity recognition unit 1102 is configured to extract a facial feature based on the face image obtained by the photographing unit, to obtain identity information of a face.

In an embodiment, for specific implementation, refer to a related function of the determining module 902 and another conventional-technology shooting function that is not described.

An expression recognition unit 1103 is configured to extract an expression feature based on the face image obtained by the photographing unit, to recognize and obtain an expression type. The expression recognition unit 1103 may alternatively obtain a comprehensive expression type of the user based on a plurality of expression types of the user that are stored by a user profile unit. The expression recognition unit 1103 may alternatively obtain a comprehensive expression type of the user in a specific time period at a time by using a neural network based on a plurality of face images of the user at different moments, where the plurality of face images of the user at different moments are stored by the user profile storage unit. In an embodiment, for specific implementation, refer to a related function of the facial attribute determining module 904 or an alternative function.

The user profile storage unit 1104 is configured to store a user profile. One user may have one profile; or a plurality of users may share one profile, and different users are distinguished by identity information (such as ID numbers and registration names). The user profile records the expression type of the user that is recognized by the expression recognition unit, and recognition time. The user profile is further used to store the comprehensive expression type of the user that is obtained through recognition by the expression recognition unit based on the plurality of expression types of the user. The user profile storage unit 1104 may also be configured to store the face image obtained by the photographing unit, and store face unlocking images of different users at different moments.

A health recognition unit 1105 (optional) is configured to extract a health feature based on the face image obtained by the photographing unit, to recognize and obtain a health type; and obtain a comprehensive health type of the user based on a plurality of health types of the user that are stored by the user profile unit. The health recognition unit 1005 may alternatively obtain a comprehensive health type of the user in a specific time period at time by using a neural network based on a plurality of face images of the user at different moments, where the plurality of face images of the user at different moments are stored by the user profile storage unit. In an embodiment, for specific implementation, refer to a related function of the facial attribute determining module 904 or an alternative function.

A recommendation content determining unit 1006 is configured to determine, based on the obtained comprehensive expression type of the user, display content matching the comprehensive expression type. In an embodiment, for specific implementation, refer to a related function of the media resource determining module 905 or an alternative function.

A recommendation content display unit 1007 is configured to display the display content determined by the recommendation content determining unit. In an embodiment, for specific implementation, refer to a related function of the push module 906 or an alternative function.

This example is summarized as follows: A terminal obtains a face image of a user. A facial recognition unlocking module/unit recognizes face information, to obtain identity information of the user. An expression recognition module/unit recognizes a facial attribute of the user based on the face image; stores a current facial attribute of a current logged-in user into a system user profile, where the user profile may include but is not limited to information such as a user ID, a facial attribute (such as emotion), and time; and obtains a comprehensive facial attribute result of the user in a time period from a current moment to a preset moment based on a facial attribute result or a face image result that is recognized for a plurality of times in the time period and that is recorded in the user profile (the facial attribute result or the face image result that is recognized for a plurality of times in the time period and that is recorded in the user profile may be analyzed by using a probability theory or a neural network, and this is not limited herein), and uses the comprehensive facial attribute result as a referable facial attribute of the user at a current moment. Further, a terminal system receives a facial attribute application initiated by an application program through an API; the terminal system returns the comprehensive facial attribute result in the recognition time period to the application program through the API; and the terminal system may further targetedly push content based on the comprehensive facial attribute result.

Figure 13:
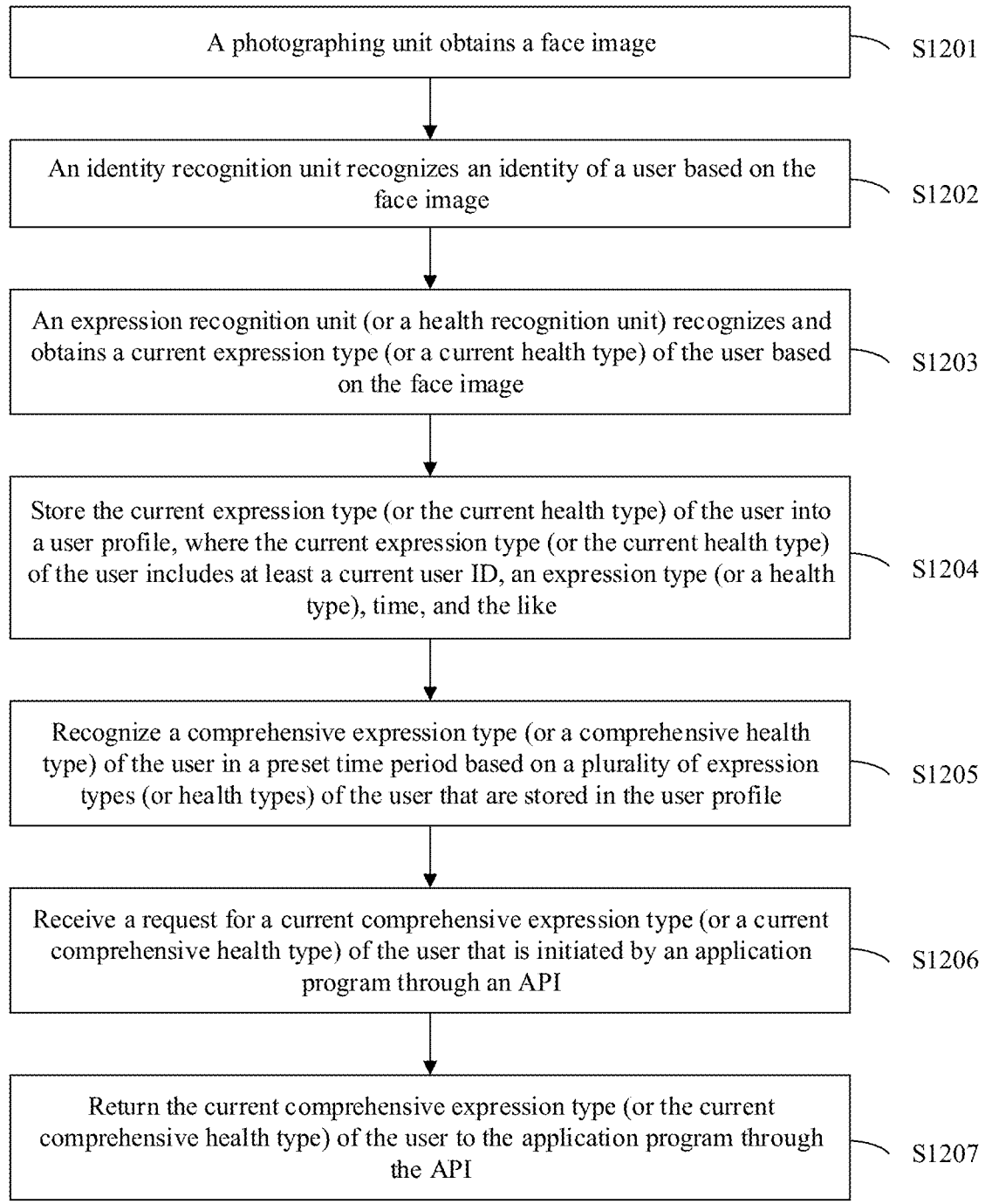
FIG. 13 is a schematic diagram of a method on a user attribute profile management system side according to an embodiment of the present disclosure.
Figure 14:
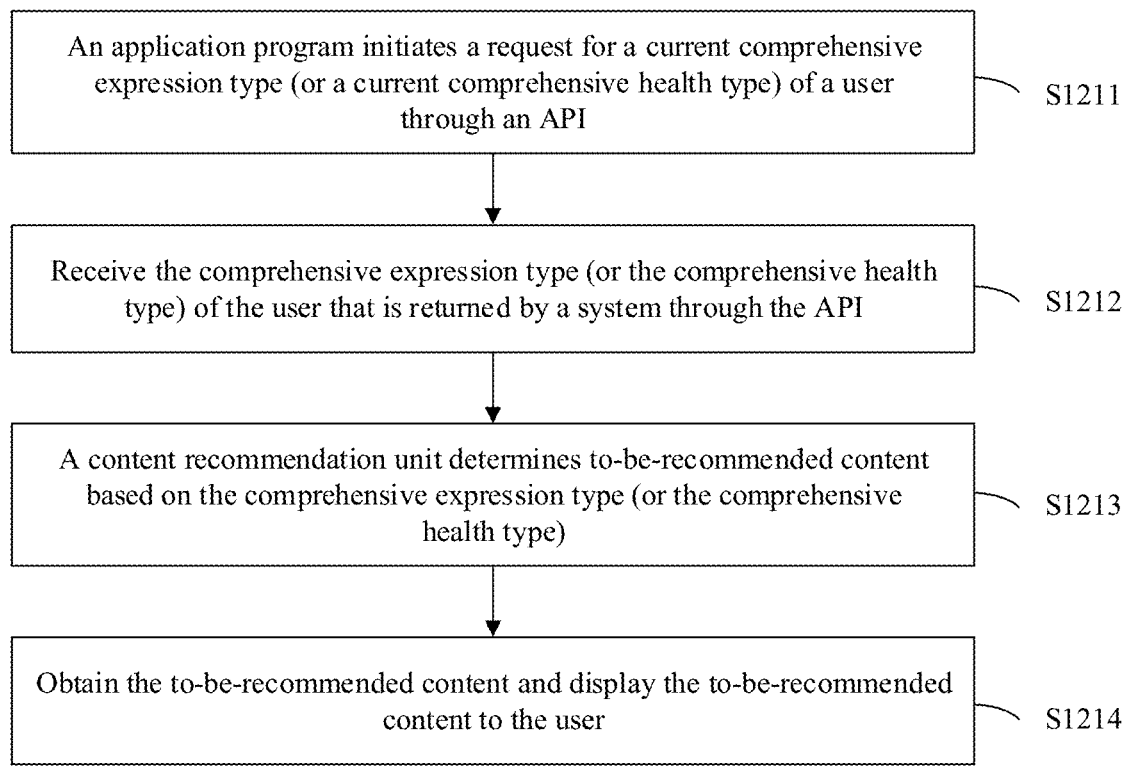
FIG. 14 is a schematic diagram of a method on a user attribute profile management application program side according to an embodiment of the present disclosure.

For a possible specific implementation method, refer to FIG. 13 and FIG. 14. FIG. 13 shows a user attribute profile management method, for example, including S1201 to S1207, on a terminal system side. FIG. 14 shows a corresponding user attribute profile management method, for example, including S1211 to S1214, on an application side.

On the Terminal System Side:

S1201: A photographing unit obtains a face image.

S1202: An identity recognition unit recognizes an identity of a user based on the face image.

S1203: An expression recognition unit (or a health recognition unit) recognizes and obtains a current expression type (or a current health type) of the user based on the face image.

S1204: Store the current expression type (or the current health type) of the user into a user profile. One user may have one profile; or a plurality of users may share one profile, and different users are distinguished by identity information (such as ID numbers and registration names). Content stored in the user profile may include a current user ID, an expression type (or a health type), time, and the like. An example of the user profile is provided in the following table.

TABLE 1

| User identifier (ID) | Expression type | Health type (optional) | Time |
|---|---|---|---|
| User A | Happy | | 2:05:45 p.m. on Jan. 1, 2019 |
| User B | Happy | | 2:10:20 p.m. on Jan. 1, 2019 |
| User A | Painful | | 2:20:05 p.m. on Jan. 1, 2019 |
| User A | Smiling | | 3:15:40 p.m. on Jan. 1, 2019 |
| User B | Sad | | 3:25:30 p.m. on Jan. 1, 2019 (a current moment) |
| User A | Painful | | 3:30:30 p.m. on Jan. 1, 2019 (a current moment) |
| User B | Sad | | 3:25:30 p.m. on Jan. 1, 2019 (a current moment) |
| . . . | . . . | . . . | . . . |

S1205: Recognize a comprehensive expression type (or a comprehensive health type) of the user in a preset time period based on a plurality of expression types (or health types) of the user that are stored in the user profile.

A method for recognizing the comprehensive expression type may be a weighting method, where a weight is inversely proportional to a difference between a moment and a current moment, and a larger difference indicates a smaller weight. A plurality of expression types of the user A before the current moment are recorded in the user profile, and a comprehensive expression type of the user A in a preset time period (for example, two hours) before the current moment is calculated. An expression type at a moment with a difference from the current moment being greater than a preset time period (for example, two hours before the current moment) is not used, and a weight is 0. Assuming a weight of the current moment is 1 and a weight of a start moment of the time period is 0, a weight may be assigned to an expression at each moment based on that a smaller difference between the moment and the current moment indicates a larger weight. The weight may increase linearly or exponentially from the start moment to the current moment. Weights of similar expressions in the time period are accumulated, and an expression whose accumulated weight ranks first is the comprehensive expression type of the user A in two hours before the current moment. For example, a weight of an expression type at a moment T1 may be calculated according to the following formula:

Weight at the moment $T1=1-($current moment$-$moment $T1)/$Preset time

Table 2 is used as an example. An accumulated weight of each type of expression of the user A in two hours before the current moment is as follows:

Expression type 1: happy 0.29
Expression type 2: painful 0.38+0.88=1.26
Expression type 3: smiling 1

An expression type with a largest accumulated weight after simple sorting is "painful". Therefore, the comprehensive expression type of the user A in two hours before the current moment is "painful".

TABLE 2

Example of a weight at each moment in the time period for the user A

| User identifier (ID) | Expression type | Health type (optional) | Moment | Weight |
|---|---|---|---|---|
| User A | Happy | | 9:05:30 a.m. on Jan. 1, 2019 | 0 |
| User A | Happy | | 2:05:30 p.m. on Jan. 1, 2019 | 0.29 |
| User A | Painful | | 2:20:30 p.m. on Jan. 1, 2019 | 0.38 |
| User A | Painful | | 3:15:30 p.m. on Jan. 1, 2019 | 0.88 |
| User A | Smiling | | 3:30:30 p.m. on Jan. 1, 2019 (a current moment) | 1 |

According to the foregoing method, it can be learned that the expression "smiling" at the current moment cannot represent the comprehensive expression of the user A in two hours, that is, it is most possible that the comprehensive expression of the user A in two hours is "painful". It is reliable that the comprehensive expression type reflects an emotion of the user A in the current time period. However, the expression "smiling" at the current moment may be a misjudgment or an inadvertent forced smile of the user A. Therefore, related content is more accurately recommended to the user based on the expression (emotion) that is of the user A in the current time period (two hours) and that is obtained according to this method, and a requirement of the user A is better met. The preset time may be determined by the system based on statistical duration of each type of expression through industry analysis. For example, duration of the expression "smiling" may be 10 minutes, duration of the expression "painful" may be four hours, and duration of the expression "sad" may be eight hours. Preset time of different expressions may also vary with persons. The system performs clustering analysis on duration of a same expression type of a same user in the user profile, to obtain duration of a specific type of expression of the user. For example, the user A is more quickly free from the expression "painful". The duration of the expression "painful" of the user A is shorter than duration of an ordinary person, where the duration of the ordinary person is four hours. In this case, the preset time may be set to two hours based on actual statistical duration of the user A, or the like.

Alternatively, the preset time may be actively set by a user in a user interface of a terminal device, or the like.

(A method for obtaining the comprehensive health type may be equivalent to the method for obtaining comprehensive expression type, and details are not described again.)

In addition, optionally, an expression result in the user profile may be obtained by using some methods in step 44 or step 52.

S1206: Receive a request for a current comprehensive expression type (or a current comprehensive health type) of the user that is initiated by an application program through an API.

S1207: Return the current comprehensive expression type (or the current comprehensive health type) of the user to the application program through the API.

On the Application Side:

S1211: The application program initiates the request for the current comprehensive expression type (or the current comprehensive health type) of the user through the API.

S1212: Receive the comprehensive expression type (or the comprehensive health type) of the user that is returned by the system through the API (where the comprehensive expression type of the user that is returned through the API may further include confidence of the expression type, and the like).

S1213: A content recommendation unit determines to-be-recommended content based on the comprehensive expression type (or the comprehensive health type).

S1214: Obtain the to-be-recommended content and display the to-be-recommended content to the user.

According to this embodiment, the comprehensive expression type of the user is obtained based on a plurality of expression types of the user in a specific time period. This is more reliable and accurate in comparison with that a single expression type is obtained for content recommendation in the conventional technology. In addition, this embodiment further provides a facial attribute profile management method for a plurality of users of a same terminal. Different users can be recognized through identity recognition, and comprehensive analysis can be performed based on historical expressions of a current user, to obtain a more reliable emotion result. This helps more accurately push a media resource.

Example 5: Obtaining a Comprehensive Facial Attribute in a Historical Period

Figure 15:
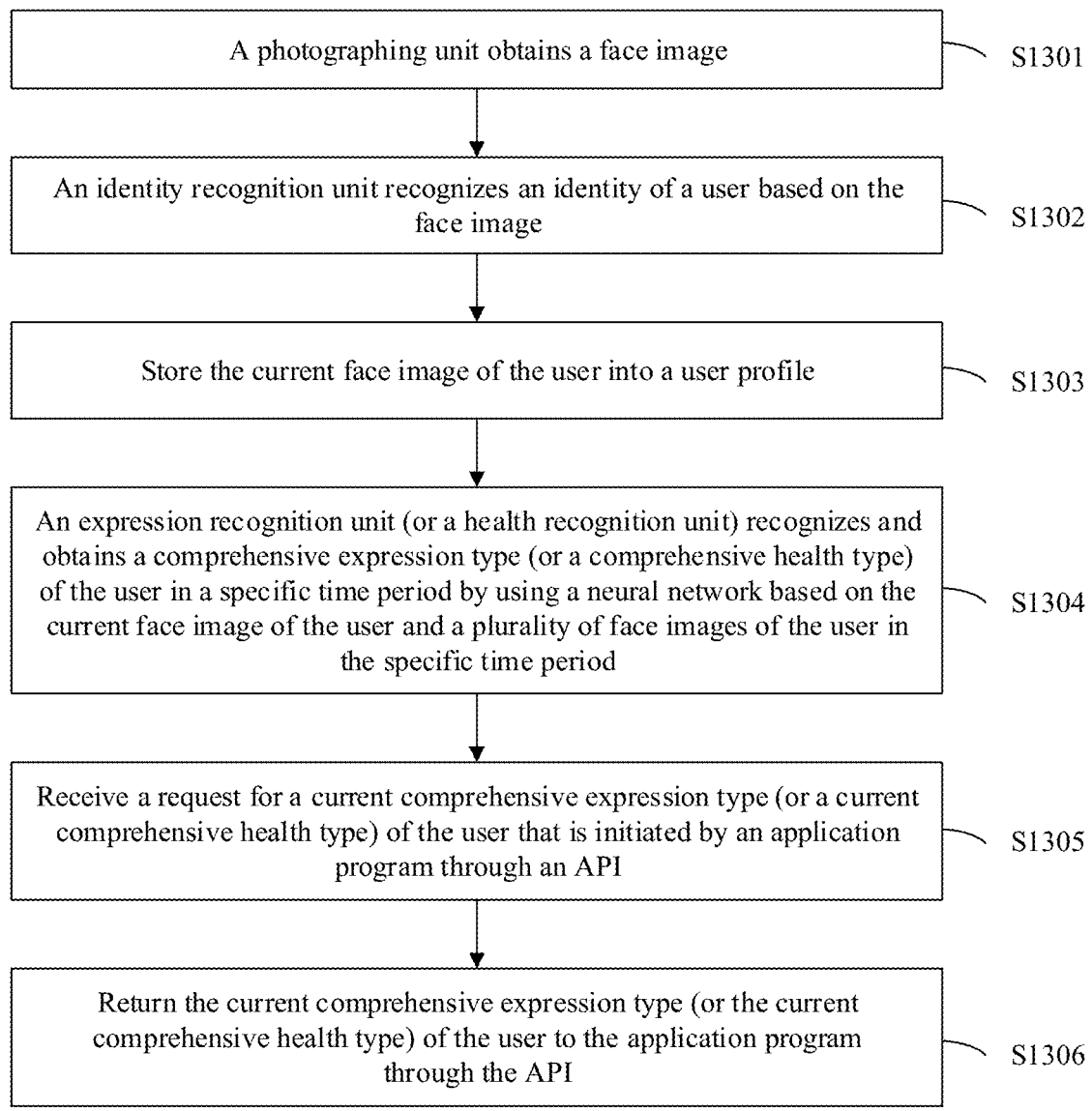
FIG. 15 is a schematic diagram of another user attribute profile management method according to an embodiment of the present disclosure.

FIG. 15 shows another possible user facial attribute profile management method, for example, including S1301 to S1306, on a terminal system side.

On the Terminal System Side:

S1301: A photographing unit obtains a face image, where an obtaining occasion is not limited.

S1302: An identity recognition unit recognizes an identity of a user based on the face image.

S1303: Store the current face image of the user into a user profile.

Specifically, if there are a plurality of users, each user corresponds to one facial attribute profile.

When the identity of the user is recognized, the obtained face image is correspondingly stored into a facial attribute profile corresponding to the user.

S1304: An expression recognition unit (or a health recognition unit) recognizes and obtains a comprehensive expression type (or a comprehensive health type) of the user in a specific time period by using a neural network based on the current face image of the user and a plurality of face images of the user in the specific time period. For details, refer to the related method in step 44, including but not limited to the method corresponding to FIG. 7 or FIG. 8.

In an embodiment, a historical face image or a historical facial attribute result corresponding to the current user may be invoked.

S1305: Receive a request for a current comprehensive expression type (or a current comprehensive health type) of the user that is initiated by an application program through an API.

S1306: Return the current comprehensive expression type (or the current comprehensive health type) of the user to the application program through the API.

On the application program side, the method is the same as that in S1211 to S1214.

According to this embodiment, face images of the user at a plurality of different moments in a time period are stored, and a comprehensive expression type (or information such as a comprehensive health type) of the user in the time period is comprehensively recognized by using a neural network. This is more reliable and accurate in comparison with that a single expression type is obtained for content recommendation in the conventional technology.

It should be understood that there are similar, overlapped, or optional steps in all the foregoing embodiments. Implementations and application scenarios of the present disclosure are diversified, and cannot be exhaustively described herein. Possible implementations and possible scenarios in the embodiments can be randomly combined without violating a natural law.

It should be understood that division into the modules in the apparatuses in the embodiments of the present disclosure is merely logical function division. In actual implementation, all or a part of the modules may be integrated into one physical entity, or the modules may be physically separated. For example, each of the foregoing modules may be a separate processing element, or may be integrated on a chip of a terminal, or may be stored in a storage element of a controller in a form of program code, and a processing element of a processor invokes and executes a function of each of the foregoing modules. In addition, the modules may be integrated together or may be implemented independently. The processing element herein may be an integrated circuit chip and has a signal processing capability. In an implementation process, steps in the foregoing methods or the foregoing modules may be implemented by using a hardware integrated logical circuit in the processing element, or by using instructions in a form of software. The processing element may be a general-purpose processor, for example, a central processing unit (CPU), or may be one or more integrated circuits configured to implement the foregoing methods, for example, one or more application-specific integrated circuits (ASIC), one or more microprocessors DSP), or one or more field programmable gate arrays (, FPGA).

It should be understood that in the specification, claims, and the accompanying drawings of the present disclosure, the terms "first", "second", and the like are intended to distinguish between similar objects but do not necessarily indicate a specific order or sequence. It should be understood that data used in such a way is interchangeable in proper circumstances, so that the embodiments described herein can be implemented in other orders than the order illustrated or described herein. In addition, the terms "include", "have", and any other variants are intended to cover non-exclusive inclusions, for example, a process, method, system, product, or device including a series of steps or modules is not necessarily limited to those clearly listed steps or modules, but may include other steps or modules that are not clearly listed or are inherent to such a process, method, product, or device.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure. It is clear that a person skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A content push method applied to a terminal, wherein the method comprises:
when the terminal is in a screen-locked state and an off-screen of the terminal is woken up, capturing a first set of face images of a current user by using a first set of cameras of the terminal and capturing a second set of face images of the current user by using a second set of cameras of the terminal, wherein the second set of cameras comprises a subset of cameras other than the first set of cameras of the terminal;
determining whether the first set of face images matches a registered user;
in response to determining that the first set of face images matches the registered user, performing, by the terminal, an unlocking operation, and determining a facial attribute of the current user based on the first set of face images and the second set of face images, wherein the facial attribute comprises an emotion or a health status;
determining a to-be-pushed media resource based on the facial attribute; and
pushing the media resource in an interface displayed after the terminal is unlocked.

2. The method according to claim 1, wherein the determining the facial attribute of the current user based on the first set of face images comprises:
determining the facial attribute of the current user based on the first set of face images and a face image of the current user that is captured in a preset historical time period.

3. The method according to claim 1, wherein the determining the facial attribute of the current user based on the first set of face images comprises:
determining a first facial attribute result based on the first set of face images;
obtaining a facial attribute result of the current user in a preset historical time period; and
determining the facial attribute of the current user based on the first facial attribute result in the preset historical time period.

4. The method according to claim 1, wherein that the off-screen of the terminal is woken up comprises: the off-screen is woken up by one or more of lifting the terminal, touching the screen, triggering a power button, an incoming call, a message prompt, data cable insertion and removal, headset insertion and removal, charger insertion and removal, or voice activation.

5. The method according to claim 1, wherein the determining the to-be-pushed media resource based on the facial attribute comprises:
determining the to-be-pushed media resource based on different degrees of health or emotion, a preset priority of a facial attribute category, or a preset priority of a media resource type, wherein the media resource comprises one or more of a shopping link, a literary book, a travel item, a film and television work, a short video, a microblog, fitness information, music, a health report, prompt information, an application program, a shortcut, or news.

6. The method according to claim 1, wherein the pushing the media resource in an interface displayed after the terminal is unlocked comprises:
pushing a notification bar or a floating window of the media resource in the interface displayed after the terminal is unlocked.

7. The method according to claim 1, wherein when the media resource is pushed in the interface displayed after the terminal is unlocked, the method further comprises:
displaying an option of an instruction indicating whether to receive the pushed media resource; and
when a push confirmation instruction of the user is received, jumping to a push link of the media resource, or playing or browsing a pushed media resource; or
when an instruction indicating that the user does not receive the push, stopping pushing of the media resource.

8. The method according to claim 1, wherein after a preset push duration, the media resource disappears from the interface displayed after the terminal is unlocked.

9. A content push apparatus applied to a terminal, wherein the apparatus comprises:
one or more processors;
a capture module executed by the one or more processors to, when the terminal is in a screen-locked state and an off-screen of the terminal is woken up, capture a first set of face images of a current user by using a first set of cameras of the terminal and capture a second set of face images of the current user by using a second set of cameras of the terminal, wherein the second set of cameras comprises a subset of cameras other than the first set of cameras of the terminal;
a determining module executed by the one or more processors to determine whether the first set of face images matches a registered user;
an unlocking module executed by the one or more processors to perform an unlocking operation in response to determining the first set of face images matches the registered user;
a facial attribute determining module executed by the one or more processor to determine a facial attribute of the current user based on the first set of face images and the second set of face images in response to determining that the first set of face images matches the registered user, wherein the facial attribute comprises at least an emotion or a health status;
a media resource determining module executed by the one or more processor to determine a to-be-pushed media resource based on the facial attribute; and
a push module executed by the one or more processors to push the media resource in an interface displayed after the terminal is unlocked.

10. The apparatus according to claim 9, wherein the facial attribute determining module is executed by the one or more processors to:
determine the facial attribute of the current user based on the first set of face images and a face image of the current user that is captured in a preset historical time period.

11. The apparatus according to claim 9, wherein the facial attribute determining module is executed by the one or more processors to:
determine a first facial attribute result based on the first set of face images;
obtain a facial attribute result of the current user in a preset historical time period; and determine the facial attribute of the current user based on the first facial attribute result and the facial attribute result of the current user in the preset historical time period.

12. The apparatus according to claim 9, wherein the off-screen is woken up by one or more of lifting the terminal, data cable insertion and removal, headset insertion and removal, charger insertion and removal, touching the screen, triggering a power button, an incoming call, a message prompt, or voice activation.

13. The apparatus according to claim 9, wherein the media resource determining module is executed by the one or more processors to determine the to-be-pushed media resource based on one or more of different degrees of health or emotion, a preset priority of a facial attribute category, or a preset priority of a media resource type, wherein the media resource comprises one or more of a shopping link, a literary book, a travel item, a film and television work, a short video, a microblog, fitness information, music, a health report, prompt information, an application program, a shortcut, or news.

14. The apparatus according to claim 9, wherein the push module is executed by the one or more processors to:
  push a notification bar or a floating window of the media resource in the interface displayed after the terminal is unlocked.

15. The apparatus according to claim 9, wherein the push module is further executed by the one or more processors to:
  when the media resource is pushed in the interface displayed after the terminal is unlocked, display an option of an instruction indicating whether to receive the pushed media resource; and when a push confirmation instruction of the current user is received, jump to a push link of the media resource, or play or browse a pushed media resource; or when an instruction indicating that the current user does not receive the push, cancel pushing of the media resource.

16. The apparatus according to claim 9, wherein after a preset push duration, the media resource disappears from the interface displayed after the terminal is unlocked.

17. A terminal device, wherein the terminal device comprises:
  a memory;
  a processor;
  a bus; and
  a camera;
  wherein the memory, the processor, and the camera are connected through the bus;
  wherein the memory is configured to store program instructions;
  wherein the processor is configured to control the camera to capture an image, and is further configured to execute the program instructions stored in the memory, to perform the method according to claim 1.

18. The terminal device according to claim 17, wherein the terminal device further comprises an antenna system, which sends and receives a wireless communication signal under control of the processor, to implement wireless communication with a mobile communications network, wherein the mobile communications network comprises one or more of the following: a GSM network, a CDMA network, a 3G network, a 4G network, a 5G network, an FDMA network, a TDMA network, a PDC network, a TACS network, an AMPS network, a WCDMA network, a TDSCDMA network, a Wi-Fi network, and an LTE network.

19. A content push method, wherein the method is applied to a terminal, the terminal comprises a first camera and a second camera, and the method comprises:
  when the terminal is in a screen-locked state and an off-screen is woken up, capturing a first set of face images of a user by using the first camera and capturing a second set of face images of the user by using the second camera of the terminal, wherein the second camera is different than the first camera of the terminal;
  determining a facial attribute of the user based on the first set of face images and the second set of face images, wherein the facial attribute comprises at least an emotion or a health status;
  determining a to-be-pushed media resource based on the facial attribute; and
  pushing the media resource in a display interface of the terminal.

20. A content push apparatus, wherein the apparatus is applied to a terminal, the terminal comprises a first camera and a second camera, and the apparatus comprises:
  one or more processors;
  a capture module executed by the one or more processors to when the terminal is in a screen-locked state and an off-screen is woken up, capture a first set of face images of a user by using the first camera and capture a second set of face images of the user by using the second camera;
  a facial attribute determining module executed by the one or more processor to determine a facial attribute of the user based on the first set of face images and the second set of face images, wherein the facial attribute comprises at least an emotion or a health status;
  a media resource determining module executed by the one or more processor to determine a to-be-pushed media resource based on the facial attribute; and
  a push module executed by the one or more processors to push or display the media resource in a display interface of the terminal.

* * * * *

UNITED STATES PATENT AND TRADEMARK OFFICE
CERTIFICATE OF CORRECTION

| | | |
|---|---|---|
| PATENT NO. | : 11,809,479 B2 | Page 1 of 1 |
| APPLICATION NO. | : 17/449389 | |
| DATED | : November 7, 2023 | |
| INVENTOR(S) | : Yingqiang Zhang et al. | |

It is certified that error appears in the above-identified patent and that said Letters Patent is hereby corrected as shown below:

In the Claims

In Claim 9, Column 38, Lines 41-42, delete "by the one or more processor to determine" and insert --by the one or more processors to determine--.

In Claim 9, Column 38, Line 49, delete "or more processor to determine" and insert --or more processors to determine--.

In Claim 20, Column 40, Lines 41-42, delete "by the one or more processor to determine" and insert --by the one or more processors to determine- --.

In Claim 20, Column 40, Line 47, delete "or more processor to determine" and insert --or more processors to determine--.

Signed and Sealed this
Sixth Day of February, 2024

Katherine Kelly Vidal
*Director of the United States Patent and Trademark Office*